(12) United States Patent
Kitazawa

(10) Patent No.: US 10,476,706 B2
(45) Date of Patent: Nov. 12, 2019

(54) EQUALIZER CIRCUIT AND CONTROL METHOD OF EQUALIZER CIRCUIT

(71) Applicant: Toshiba Memory Corporation, Minato-ku, Tokyo (JP)

(72) Inventor: Naoki Kitazawa, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/124,469

(22) Filed: Sep. 7, 2018

(65) Prior Publication Data

US 2019/0296945 A1 Sep. 26, 2019

(30) Foreign Application Priority Data

Mar. 23, 2018 (JP) ................................. 2018-055570

(51) Int. Cl.
*H03H 7/30* (2006.01)
*H04L 25/03* (2006.01)

(52) U.S. Cl.
CPC .............. *H04L 25/03057* (2013.01); *H04L 2025/03471* (2013.01); *H04L 2025/03808* (2013.01)

(58) Field of Classification Search
CPC ..... H04L 25/03057; H04L 2025/03471; H04L 2025/03808

USPC ......................... 375/229, 230, 232, 233, 355
See application file for complete search history.

(56) References Cited

U.S. PATENT DOCUMENTS

| | | | |
|---|---|---|---|
| 9,036,764 B1* | 5/2015 | Hossain | H03L 7/087 375/355 |
| 9,191,245 B2 | 11/2015 | Tan | |
| 9,397,725 B2 | 7/2016 | Fujii | |
| 9,401,800 B1* | 7/2016 | Kang | H04L 7/0062 |
| 10,305,704 B1* | 5/2019 | Kenyon | H04L 25/03057 |
| 2017/0005841 A1 | 1/2017 | Komori et al. | |

FOREIGN PATENT DOCUMENTS

| | | |
|---|---|---|
| JP | 2015-211270 A | 11/2015 |
| JP | 2016-025662 A | 2/2016 |
| JP | 2017-017568 A | 1/2017 |

\* cited by examiner

*Primary Examiner* — Tesfaldet Bocure
(74) *Attorney, Agent, or Firm* — White & Case LLP

(57) ABSTRACT

According to one embodiment, an equalizer circuit includes a nonlinear equalizer including: a determination circuit configured to generate a second signal indicating a digital value of a first signal, based on a first clock signal; a clock generation circuit configured to generate a second clock signal having a time constant of a falling edge larger than a time constant of a rising edge, based on the first clock signal; and a feedback circuit configured to generate a third signal by feeding back the second signal to the first signal, based on the second clock signal.

19 Claims, 27 Drawing Sheets

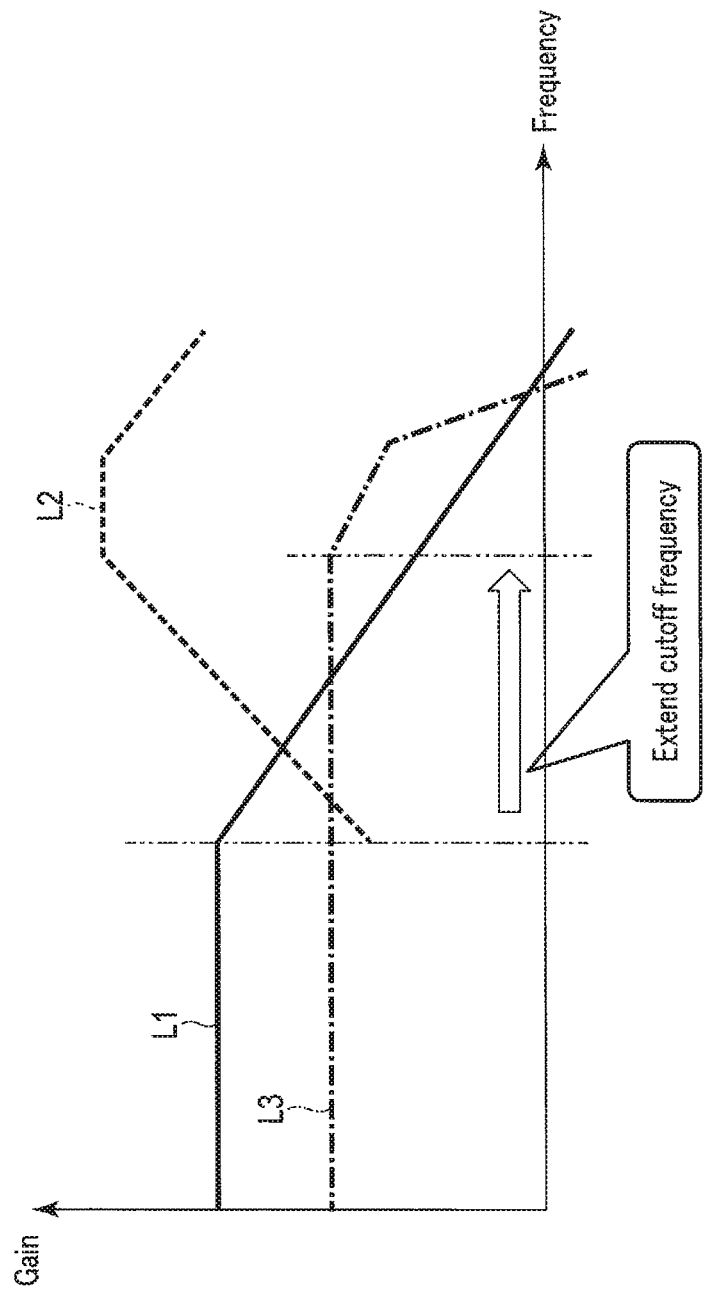
F I G. 2

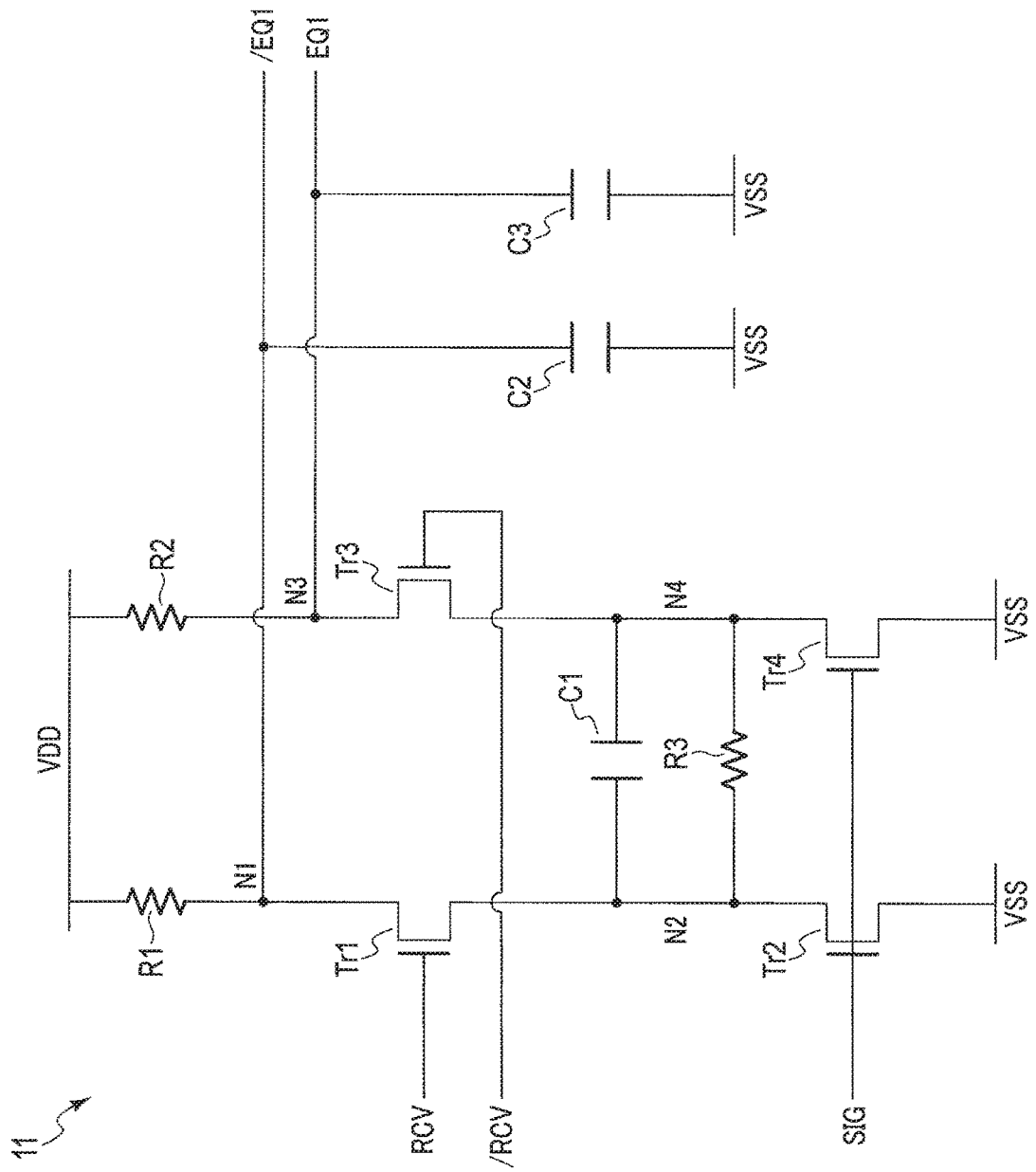
F I G. 4

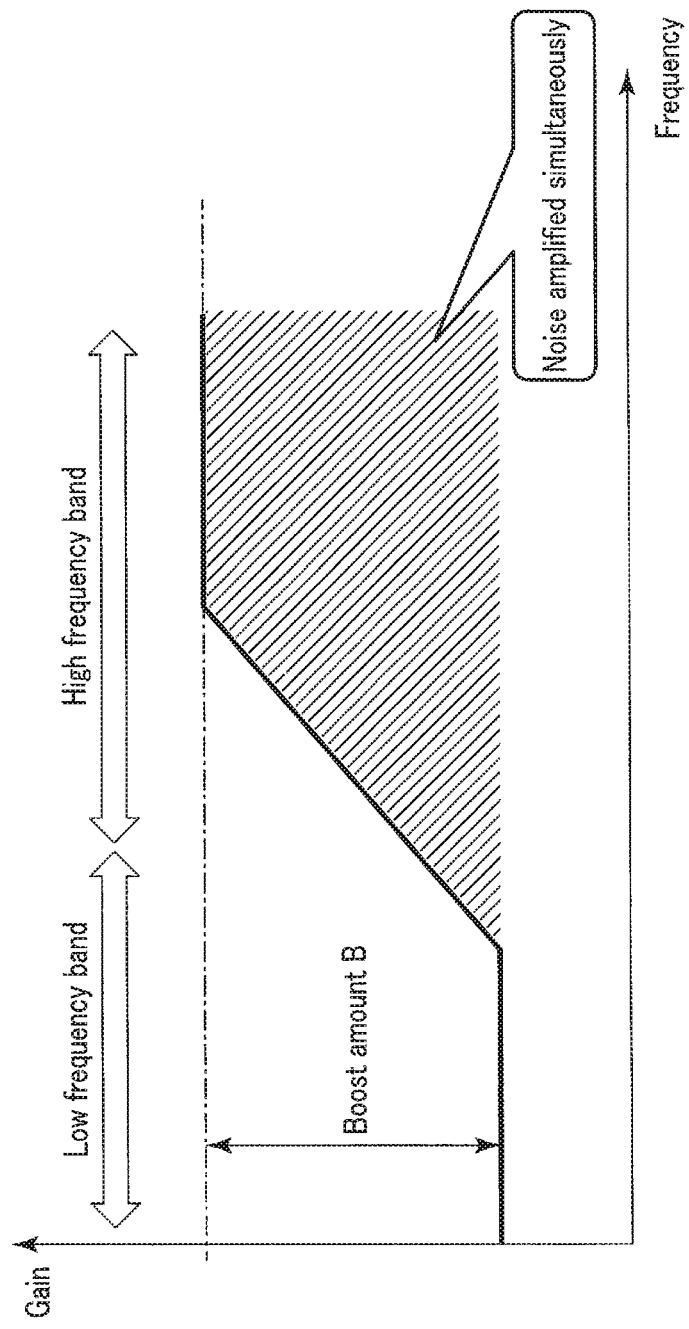
F I G. 5

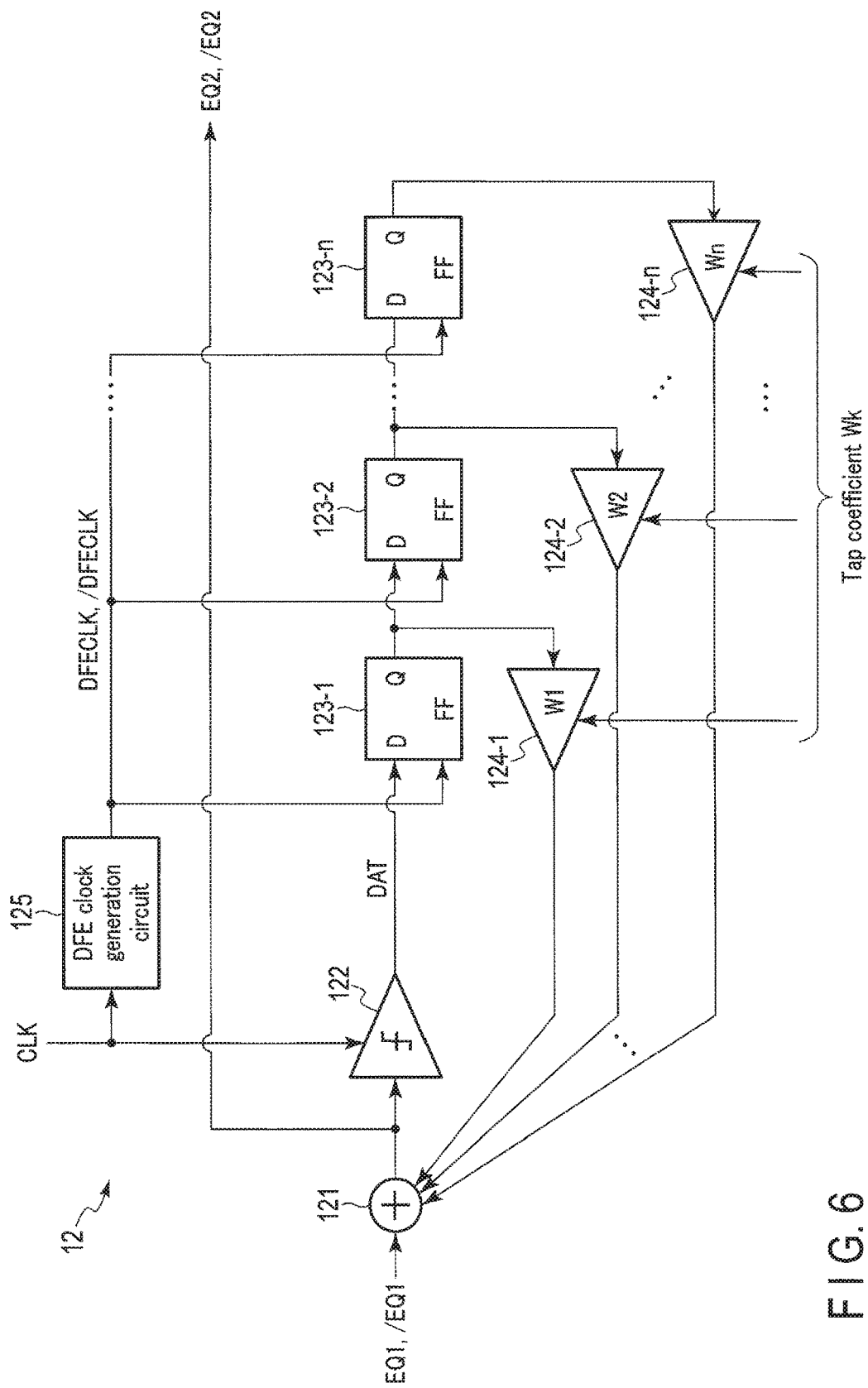
F I G. 6

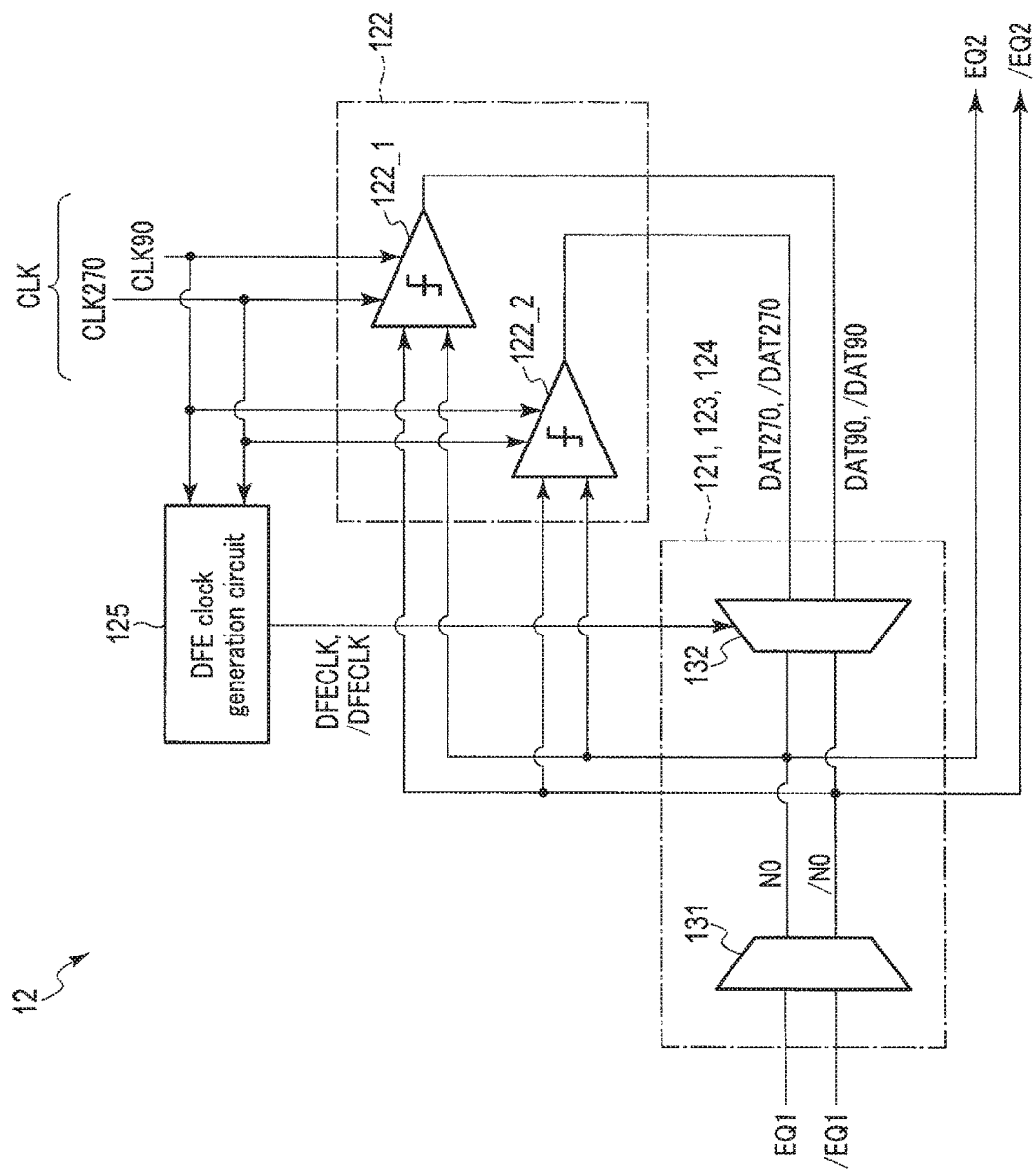
F I G. 7

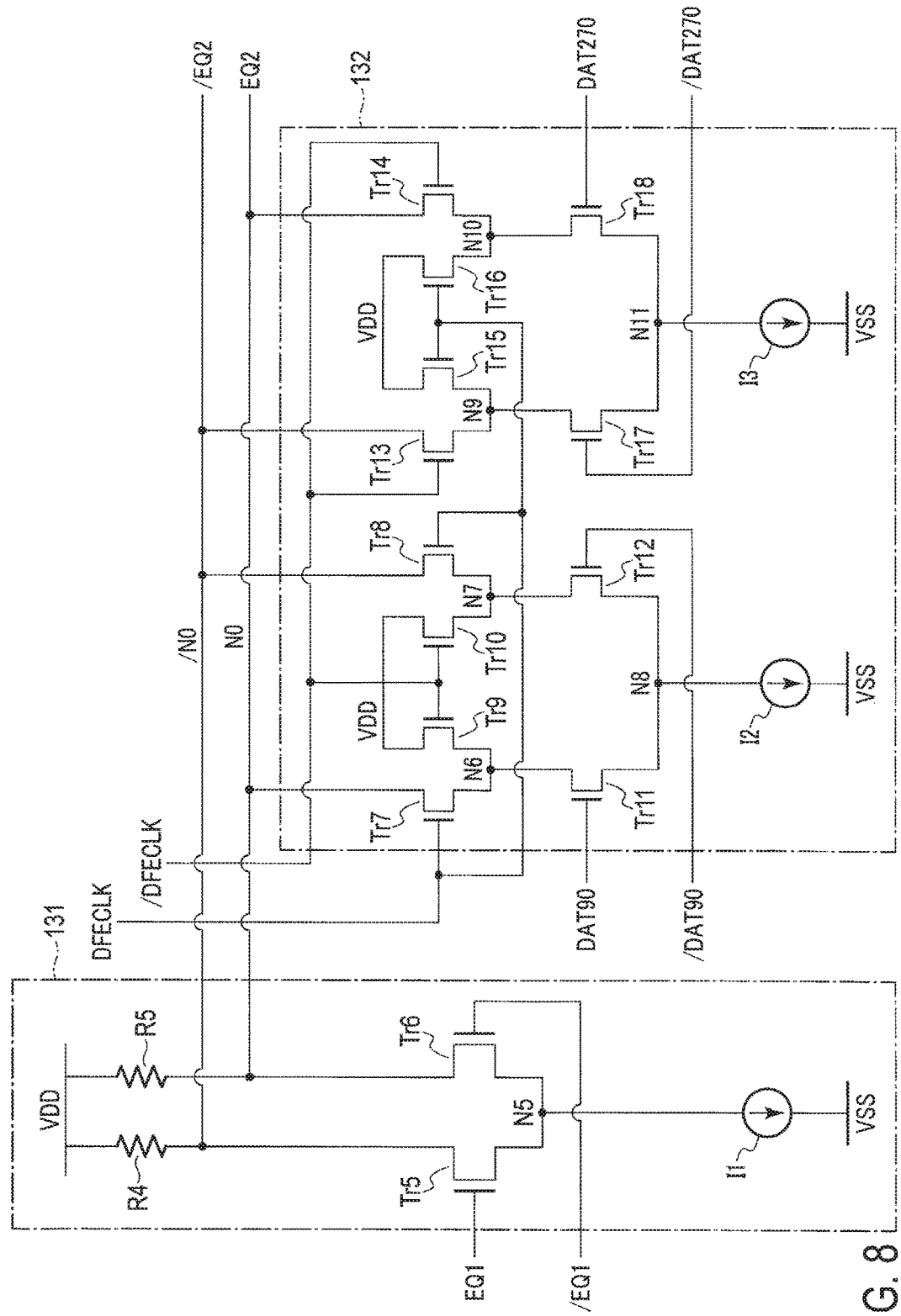
F I G. 8

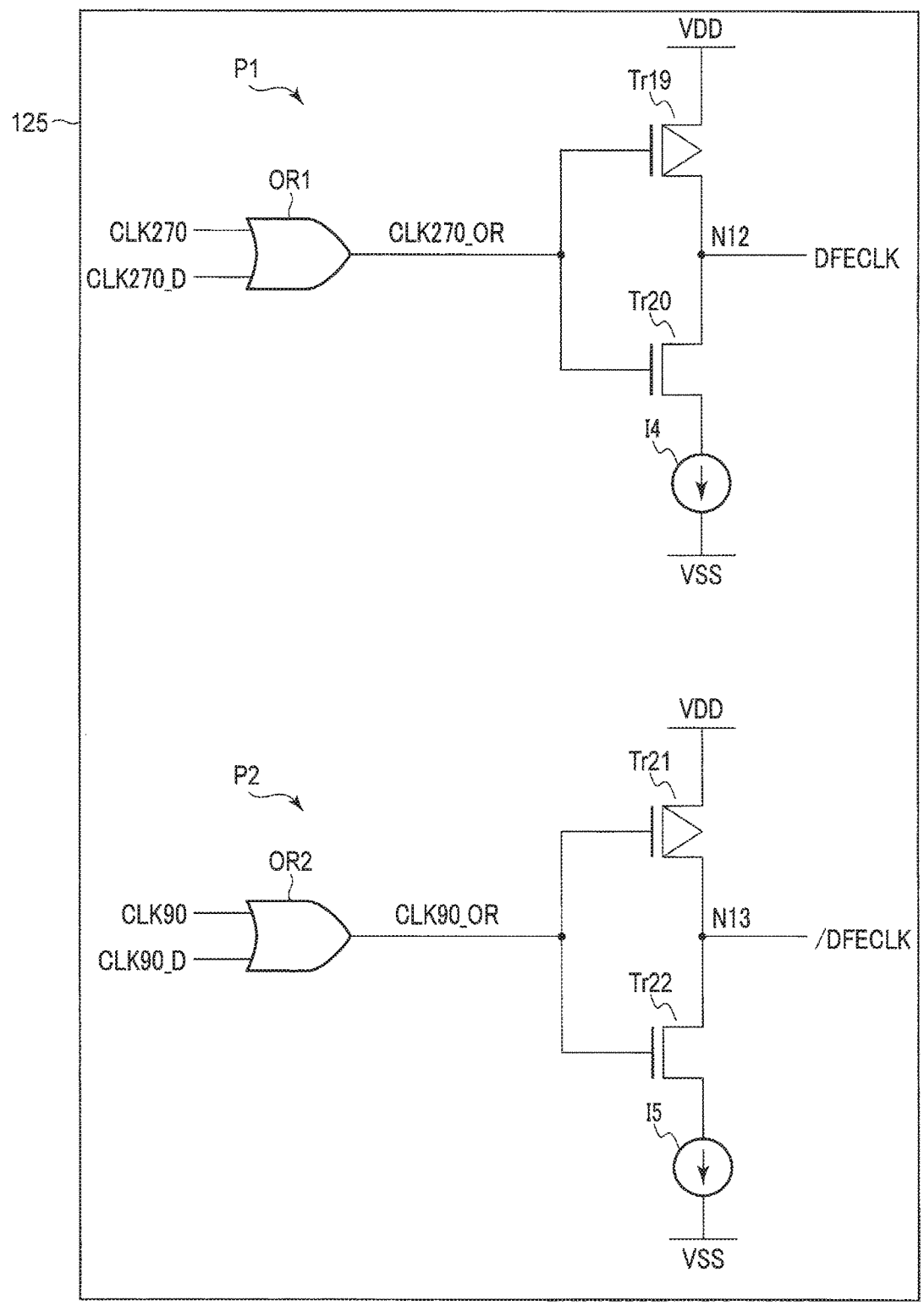
F I G. 9

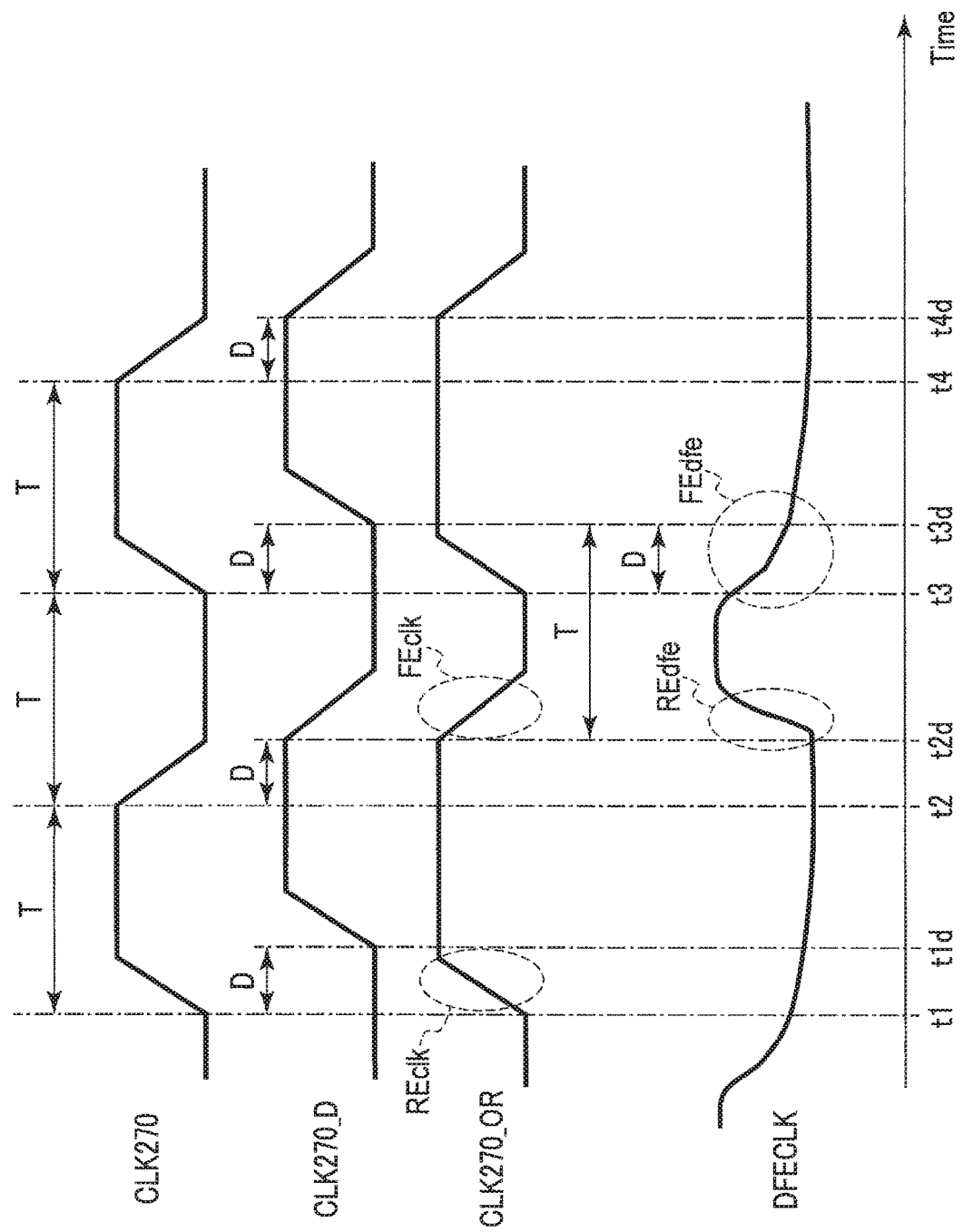
F I G. 10

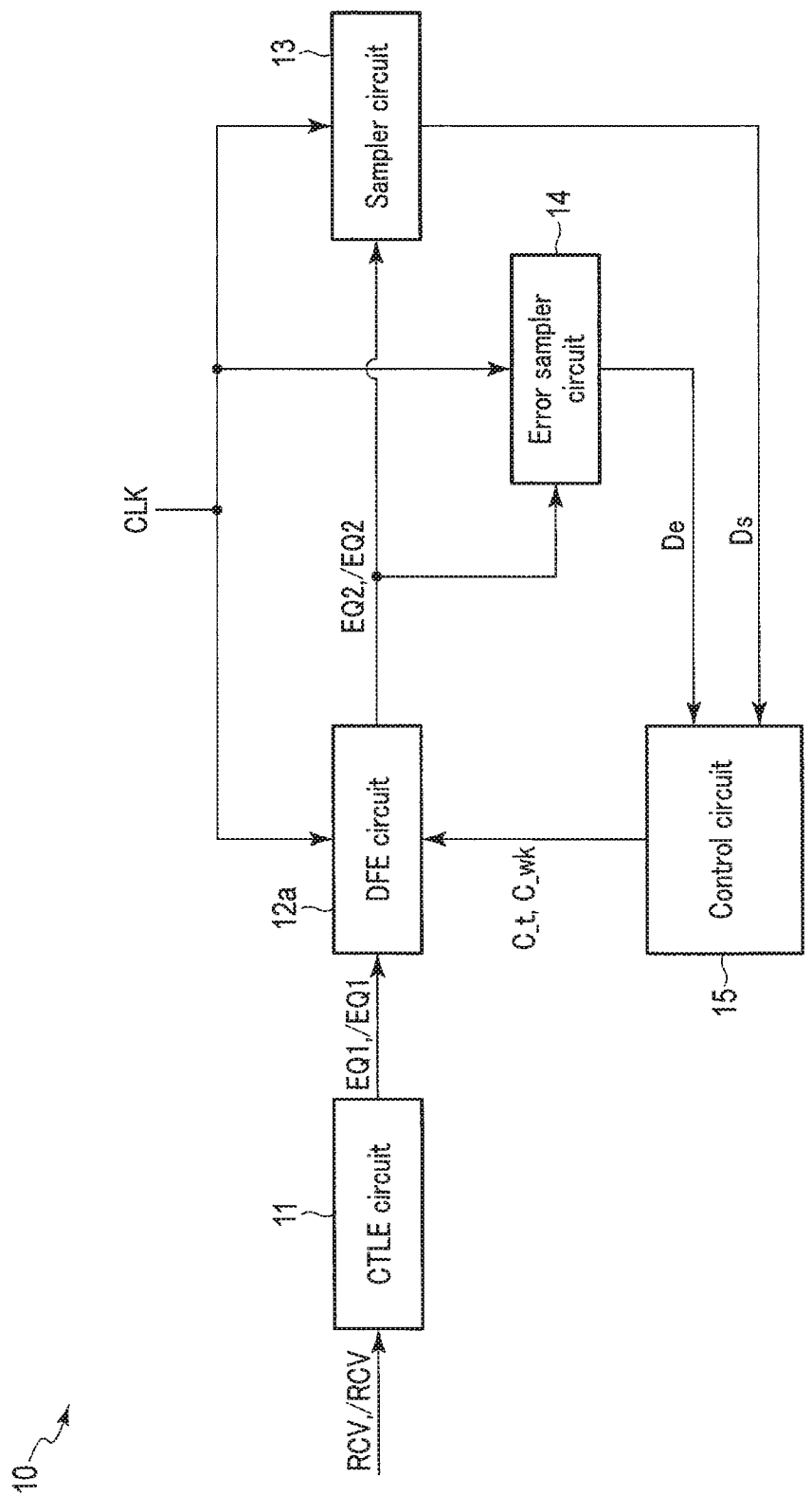
F I G. 14

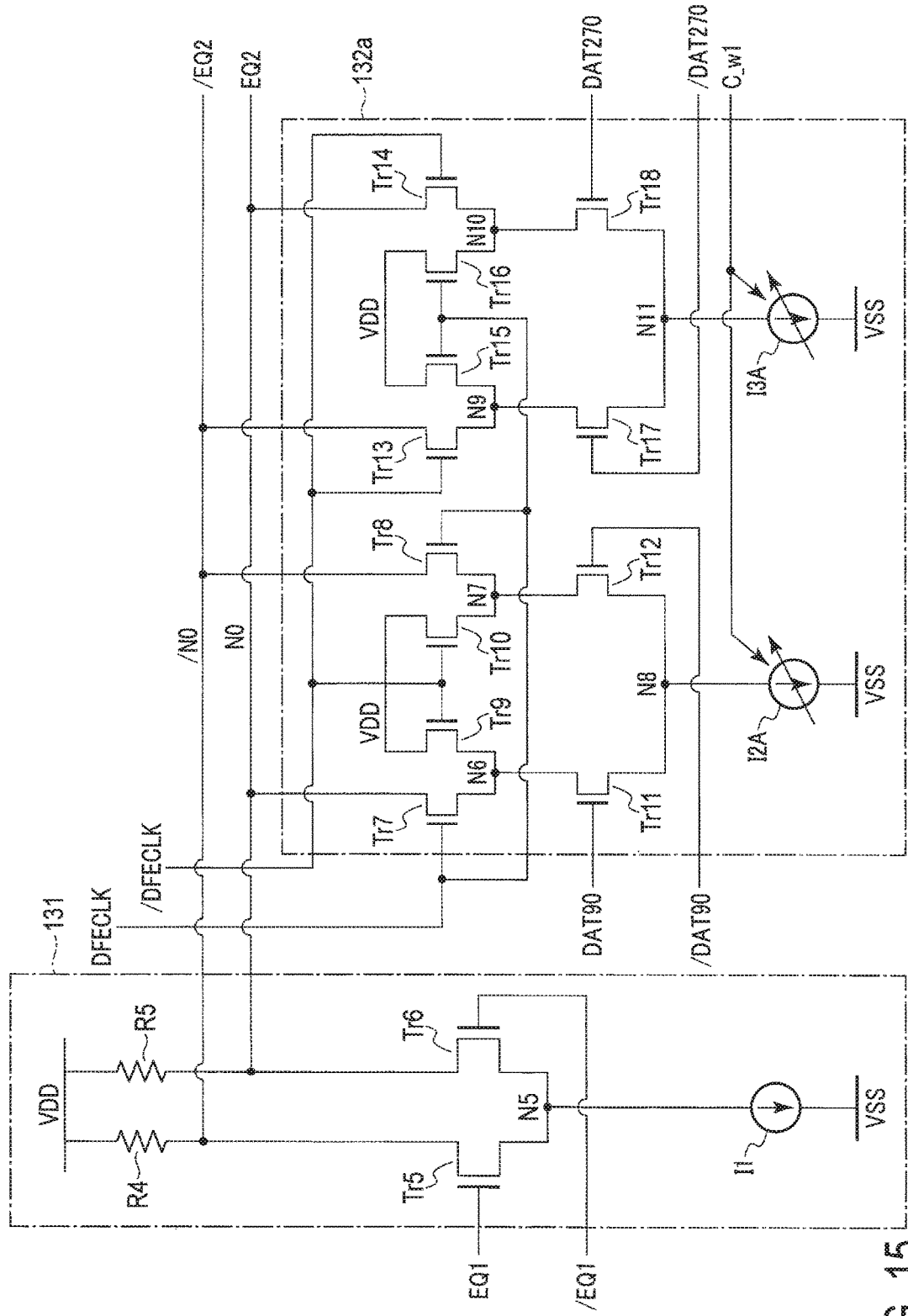
F I G. 15

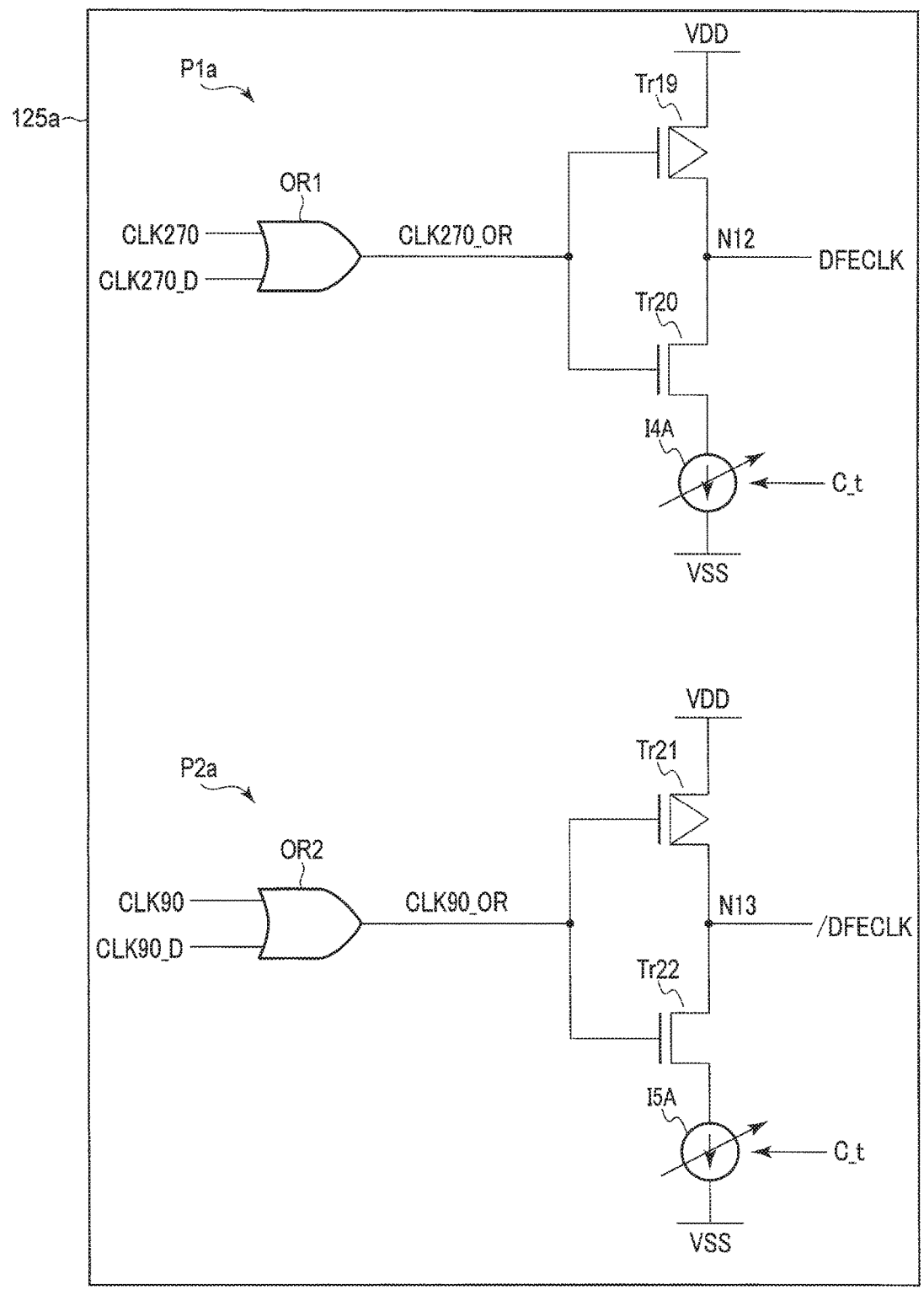
F I G. 16

| Sampling timing | Sampling type | | Tap coefficient signal C_w1 | Case |
|---|---|---|---|---|
| | Ds | De | | |
| | Tc | Ta | Tc | | |
| Determination result | 1 | 0 | 0 | Increase | X1 |
| | 1 | 1 | 0 | Decrease | X2 |
| | 1 | 0 | 1 | Decrease | X3 |
| | 1 | 1 | 1 | Increase | X4 |
| | 0 | 1 | 0 | Increase | X5 |
| | 0 | 0 | 0 | Decrease | X6 |
| | 0 | 1 | 1 | Decrease | X7 |
| | 0 | 0 | 1 | Increase | X8 |

F I G. 19

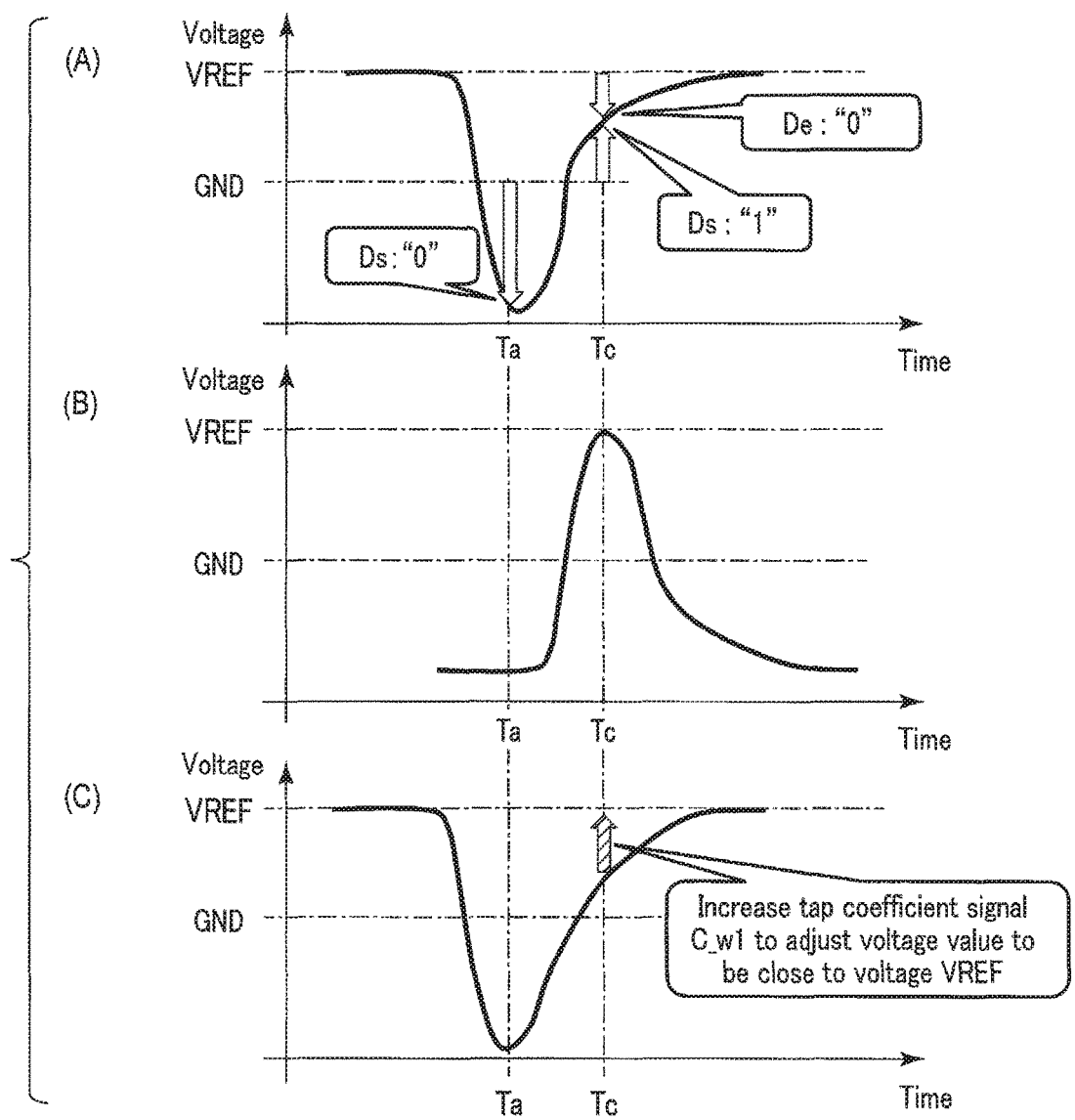
F I G. 20

| | Sampling type | | | Time constant signal C_t | Case |
|---|---|---|---|---|---|
| | Ds | De | | | |
| Sampling timing | Tc | Ta | Td | | |
| Determination result | 1 | 0 | 0 | Decrease | Y1 |
| | 1 | 1 | 0 | Increase | Y2 |
| | 1 | 0 | 1 | Increase | Y3 |
| | 1 | 1 | 1 | Decrease | Y4 |
| | 0 | 1 | 0 | Decrease | Y5 |
| | 0 | 0 | 0 | Increase | Y6 |
| | 0 | 1 | 1 | Increase | Y7 |
| | 0 | 0 | 1 | Decrease | Y8 |

FIG. 22

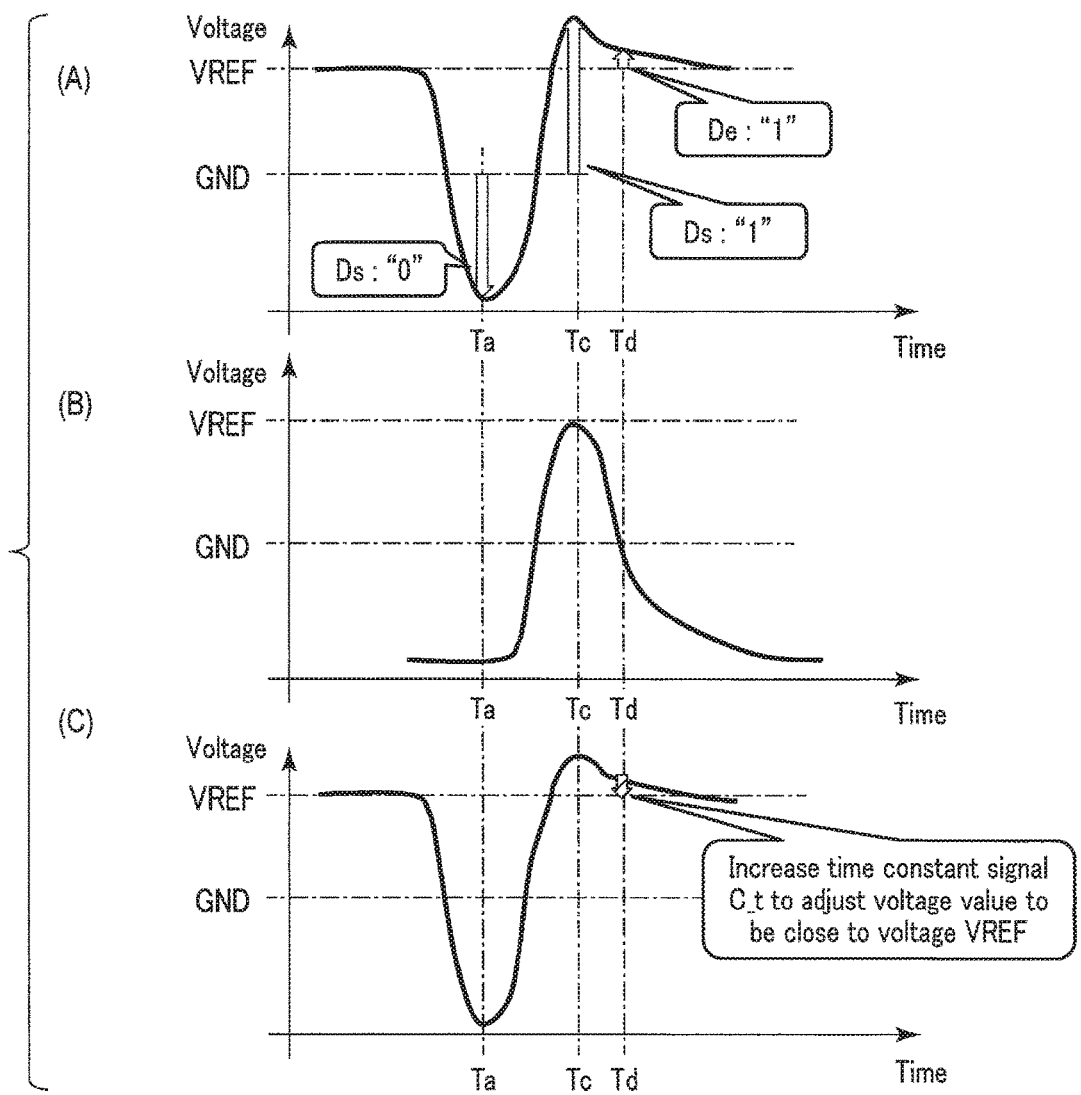
F I G. 24

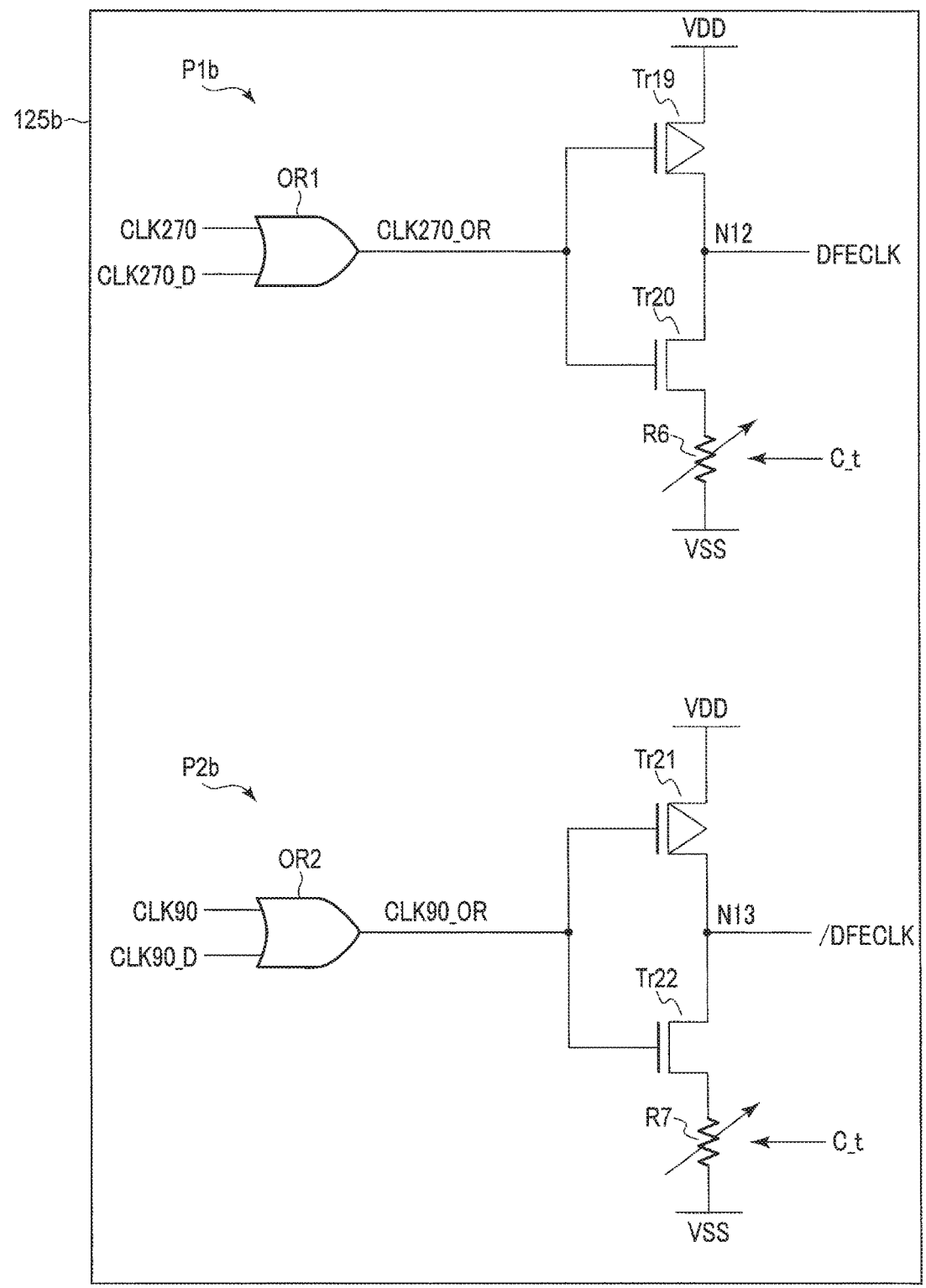
F I G. 25

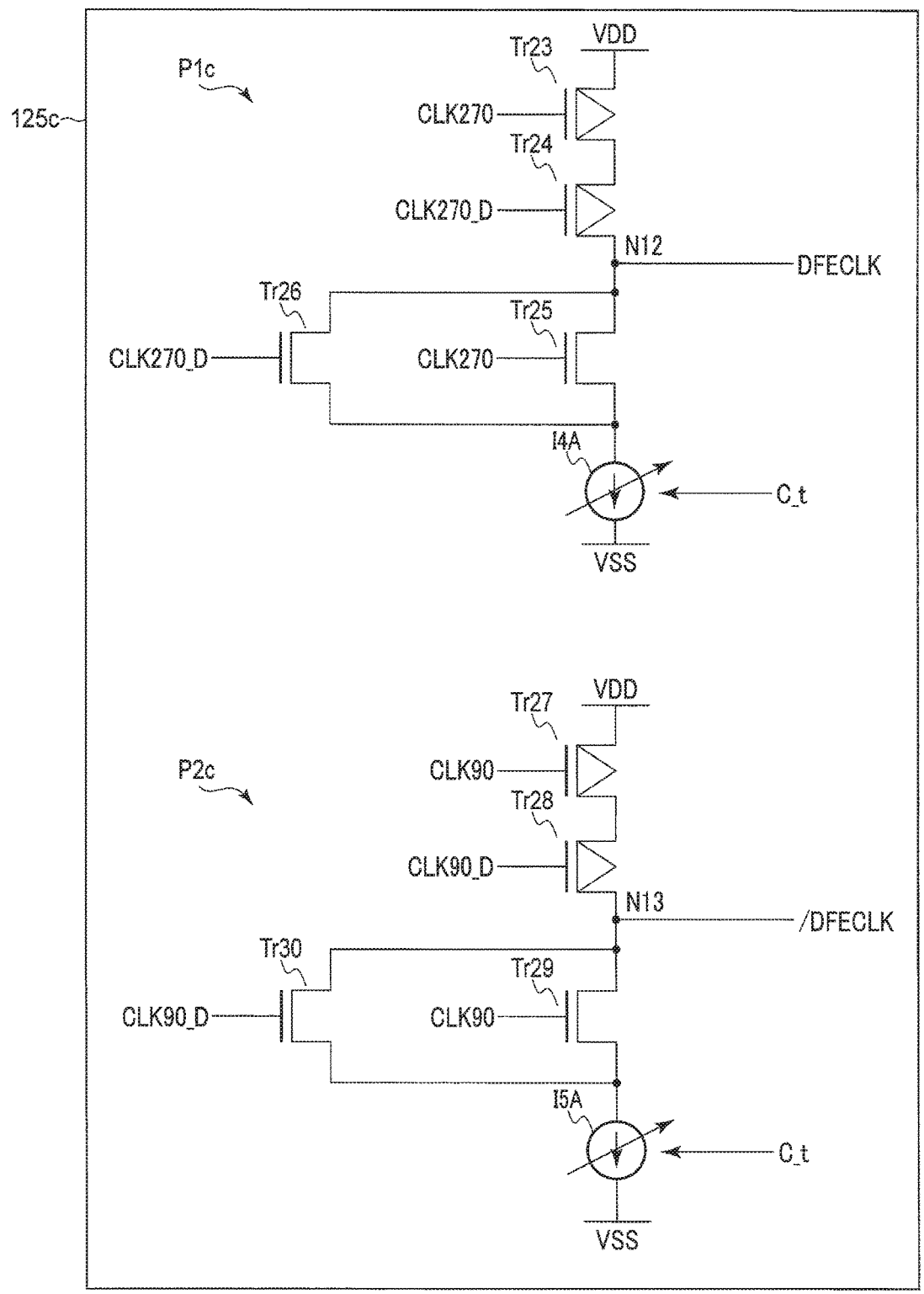
F I G. 26

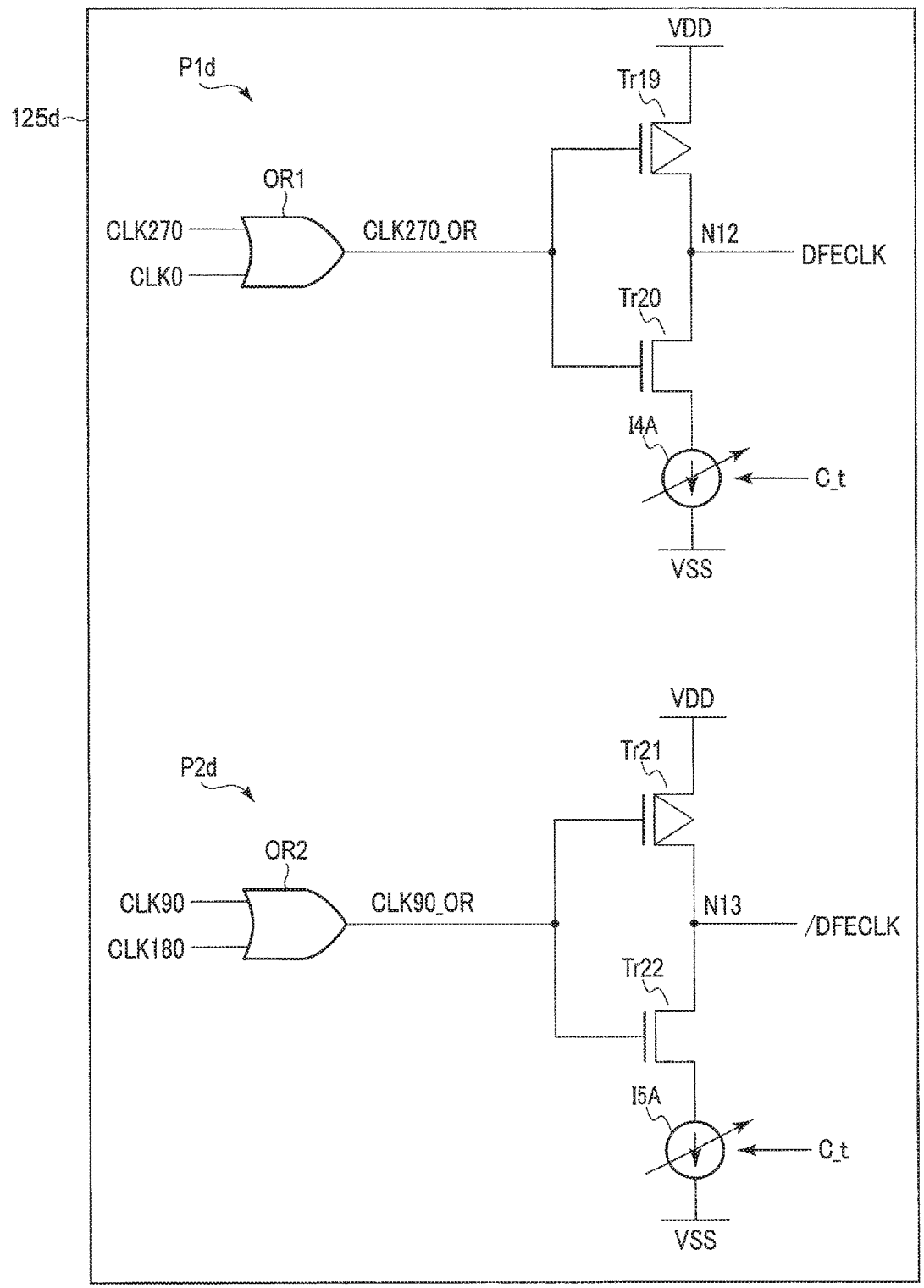
F I G. 27

EQUALIZER CIRCUIT AND CONTROL METHOD OF EQUALIZER CIRCUIT

CROSS-REFERENCE TO RELATED APPLICATIONS

This application is based upon and claims the benefit of priority from Japanese Patent Application No. 2018-055570, filed Mar. 23, 2018, the entire contents of which are incorporated herein by reference.

FIELD

Embodiments described herein relate generally to an equalizer circuit and a control method of the equalizer circuit.

BACKGROUND

An equalizer circuit for compensating for a loss caused by a transmission characteristic of a transmission path is known.

BRIEF DESCRIPTION OF THE DRAWINGS

FIG. 2 is a diagram for explaining a relationship between a transmission characteristic of a transmission path and a waveform equalization characteristic of the equalizer circuit according to the first embodiment.

FIG. 4 is a circuit diagram for explaining a circuit configuration of a CTLE circuit of the equalizer circuit according to the first embodiment.

FIG. 5 is a diagram for explaining a functional configuration of the CTLE circuit of the equalizer circuit according to the first embodiment.

FIG. 6 is a block diagram for explaining a functional configuration of a DFE circuit of the equalizer circuit according to the first embodiment.

FIG. 7 is a block diagram for explaining another example of a functional configuration of the DFE circuit of the equalizer circuit according to the first embodiment.

FIG. 8 is a circuit diagram for explaining a circuit configuration of the DFE circuit of the equalizer circuit according to the first embodiment.

FIG. 9 shows circuit diagrams for explaining a circuit configuration of a DFE clock generation circuit of the equalizer circuit according to the first embodiment.

FIG. 10 is a timing chart for explaining an operation of the DFE clock generation circuit of the equalizer circuit according to the first embodiment.

FIG. 14 is a block diagram for explaining a functional configuration of an equalizer circuit according to a second embodiment.

FIG. 15 is a circuit diagram for explaining a circuit configuration of a DFE circuit of the equalizer circuit according to the second embodiment.

FIG. 16 shows circuit diagrams for explaining a circuit configuration of a DFE clock generation circuit of the equalizer circuit according to the second embodiment.

FIG. 19 is a table for explaining a tap coefficient signal update operation of the equalizer circuit according to the second embodiment.

FIG. 20 shows diagrams for explaining an example of the tap coefficient signal update operation of the equalizer circuit according to the second embodiment.

FIG. 22 is a table for explaining update operation of a time constant signal of the equalizer circuit according to the second embodiment.

FIG. 24 shows diagrams for explaining another example of the time constant signal update operation of the equalizer circuit according to the second embodiment.

FIG. 25 shows circuit diagrams for explaining a circuit configuration of a DFE clock generation circuit of an equalizer circuit according to a first modification.

FIG. 26 shows circuit diagrams for explaining a circuit configuration of a DFE clock generation circuit of an equalizer circuit according to a second modification.

FIG. 27 shows circuit diagrams for explaining a circuit configuration of a DFE clock generation circuit of an equalizer circuit according to a third modification.

DETAILED DESCRIPTION

In general, according to one embodiment, an equalizer circuit includes a nonlinear equalizer including: a determination circuit configured to generate a second signal indicating a digital value of a first signal, based on a first clock signal; a clock generation circuit configured to generate a second clock signal having a time constant of a falling edge larger than a time constant of a rising edge, based on the first clock signal; and a feedback circuit configured to generate a third signal by feeding back the second signal to the first signal, based on the second clock signal.

Hereinafter, embodiments will be explained with reference to the accompanying drawings. In the explanations below, structural elements having similar functions and configurations will be denoted by the same reference symbols.

In the description set forth below, "/" appended to the beginning of a signal name indicates that the signal is an inverted signal

1. First Embodiment

An equalizer circuit according to a first embodiment will be described.

1.1 Configuration

First, a configuration of the equalizer circuit according to the first embodiment will be described.

1.1.1 Configuration of Transmission System

Figure 1:
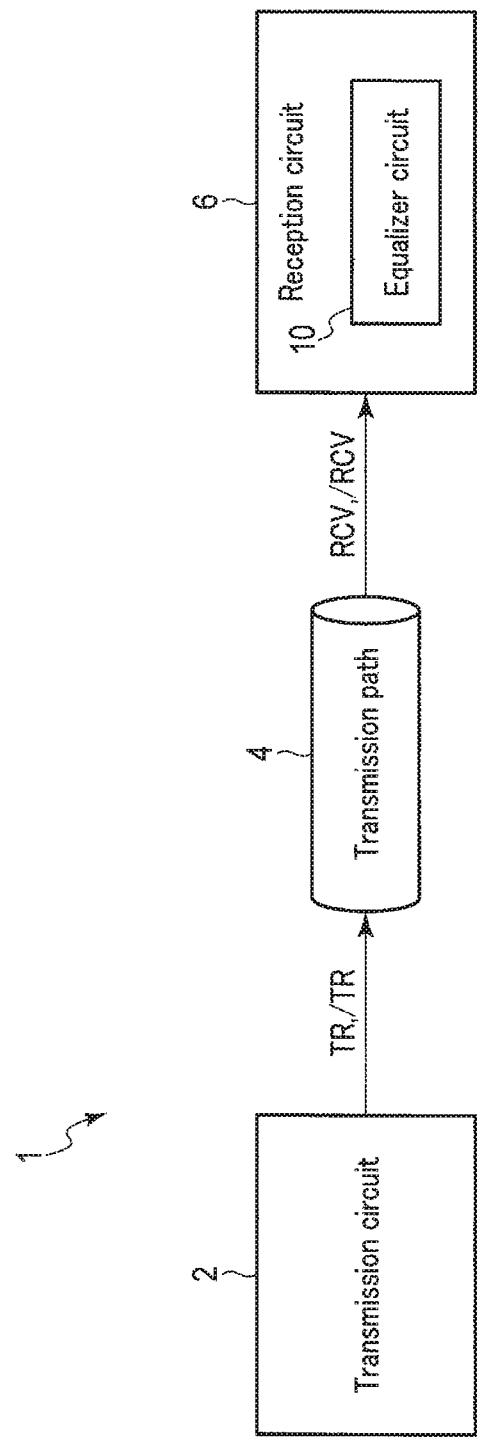
FIG. 1 is a block diagram for explaining a functional configuration of a transmission system including an equalizer circuit according to a first embodiment.

FIG. 1 is a block diagram showing an example of a functional configuration of a transmission system including the equalizer circuit according to the first embodiment. For example, the transmission system 1 includes a plurality of circuits provided on a printed board, and transmits various data from one circuit to another, using high-speed serial communications.

As shown in FIG. 1, the transmission system 1 includes a transmission circuit 2, a transmission path 4, and a reception circuit 6. The transmission circuit 2 and the reception circuit 6 realize the high-speed serial communications via the transmission path 4.

The transmission circuit 2 has a functional configuration for transmitting a transmission signal TR to the reception circuit 6 via the transmission path 4. Transmission signals TR and /TR are, for example, pulse signals having a series of digital values "0" and "1" that are distinguishable at each of a plurality of consecutive times (sections). The transmission circuit 2 transmits information encoded with the pulse signals to the reception circuit 6 via the transmission path 4.

The transmission path 4 is a physical or spatial transmission medium for transmitting the transmission signals TR and /TR to the reception circuit 6, and is, for example, a wiring connecting the transmission circuit 2 and the reception circuit 6. The transmission path 4 may have various transmission characteristics, depending on a physical structure and material of the transmission medium. The transmission characteristics include, for example, a frequency characteristic undergoing a gain loss in a specific frequency band. The transmission signals TR and /TR are converted into reception signals RCV and /RCV after undergoing the loss corresponding to the transmission characteristics of the transmission path 4, and are input to the reception circuit 6.

The reception circuit 6 receives the reception signals RCV and /RCV and decodes information included in the transmission signals TR and /TR, based on the reception signals RCV and /RCV. However, if the waveforms of the reception signals RCV and /RCV are very different from those of the transmission signals TR and /TR due to transmission through the transmission path 4, there may be a case where the reception circuit 6 cannot correctly decode the information. Even in such a case, in order to correctly decode the information included in the transmission signals TR and /TR, the reception circuit 6 includes an equalizer circuit 10.

The equalizer circuit 10 has a functional configuration for compensating a loss that occurs in a certain frequency band due to the transmission characteristics of the transmission path 4.

FIG. 2 is a diagram for explaining a relationship between the loss in the transmission path and the compensation by the equalizer circuit 10 in the transmission system according to the first embodiment. In FIG. 2, the transmission characteristic L1 of the transmission path 4, the compensation characteristic (hereinafter referred to as a waveform equalization characteristic as well) L2 of the equalizer circuit 10, and the composite characteristic L3 of both the transmission characteristic of the transmission path 4 and the waveform equalization characteristic of the equalizer circuit 10 are denoted as characteristics L1, L2 and L3, respectively.

As shown in FIG. 2, transmission characteristic L1 of the transmission path 4 has, for example, the characteristic of a low-pass filter that attenuates high frequency components. As a result, the transmission signals TR and /TR are converted into reception signals RCV and /RCV having no high frequency components due to passage through the transmission path 4. Accordingly, even when pulse signals having a sharp edge are transmitted as the transmission signals TR and /TR, the reception signals RCV and /RCV can have a waveform having a dull edge. It is therefore likely that the reception signals RCV and /RCV cause an inter symbol interference (ISI) in which waveforms overlap between adjacent sections of data though they should be separate from each other.

On the other hand, the waveform equalization characteristic L2 of the equalizer circuit 10 is set such that the gain of a high frequency band is high. Therefore, the cutoff frequency of the composite characteristic L3 extends with respect to the transmission characteristic L1. That is, signals whose losses are compensated by the equalizer circuit 10 are equalized and have such a shape as enables more reliable decoding of information included in the transmission signals TR and /TR, than the reception signals RCV and /RCV whose losses are not compensated by the equalizer circuit 10.

1.1.2 Configuration of Equalizer Circuit

Next, a configuration example of the equalizer circuit according to the first embodiment will be described.

Figure 3:
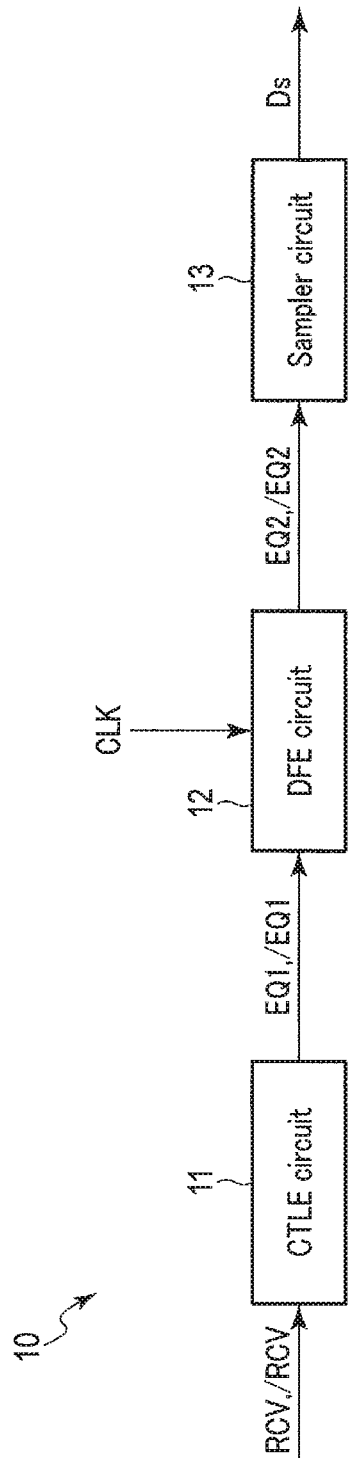
FIG. 3 is a block diagram for explaining a functional configuration of the equalizer circuit according to the first embodiment.

FIG. 3 is a block diagram for illustrating an example of the functional configuration of the equalizer circuit according to the first embodiment. As shown in FIG. 3, the equalizer circuit 10 includes a continuous time linear equalizer (CTLE) circuit 11, a decision feedback equalizer (DFE) circuit 12 and a sampler circuit 13.

The CTLE circuit 11 includes, for example, a continuous time linear equalizer. The CTLE circuit 11 has a functional configuration which, in response to the receipt of reception signals RCV and /RCV, performs linear equalization processing for amplifying (boosting) the gains in the high frequency bands of the reception signals RCV and /RCV. The CTLE circuit 11, for example, boosts the high frequency bands of the reception signals RCV and /RCV in accordance with a predetermined boost amount, and generates equalization signals EQ1 and /EQ1. The CTLE circuit 11 transmits the equalization signals EQ1 and /EQ1 to the DFE circuit 12.

The DFE circuit 12 is, for example, a nonlinear equalizer including a decision feedback equalizer. Based on a clock signal CLK, the DFE circuit 12 determines whether a digital value of an input signal is "0" or "1" in a plurality of sections from the present to the past, and generates determination signals based on the determination results. The DFE circuit 12 has a functional configuration that performs, for example, a nonlinear equalization process in which a determination signal is fed back to the input signal, based on a predetermined tap coefficient. The clock signal CLK is determined beforehand, for example, by a predetermined method. In the input signal, the tap coefficient corresponds to a digital value of a portion corresponding to a kth section in the past from a reference time. Note that k is an integer from 1 to n (n is an arbitrary natural number).

Specifically, the DFE circuit 12 combines a feedback signal, generated by multiplying the determination signal by the tap coefficient, with equalization signals EQ1 and /EQ1 to generate equalization signals EQ2 and /EQ2. The DFE circuit 12 transmits equalization signals EQ2 and /EQ2 to the sampler circuit 13.

The sampler circuit 13 determines data included in the equalization signals EQ2 and /EQ2 compensated by the CTLE circuit 11 and the DFE circuit 12, and generates sampling results Ds. As a result, the equalizer circuit 10 can read sampling results Ds as data considered to be included in the transmission signals TR and /TR. The sampler circuit 13 may use, for example, an intermediate value (e.g., 0 V)

between each of the amplitudes of equalization signals EQ2 and /EQ2 as a reference voltage, and may determine data included in equalization signals EQ2 and /EQ2 in accordance with whether equalization signals EQ2 and /EQ2 are greater than the reference voltage.

1.1.3 Configuration of CTLE Circuit

Next, a configuration of the CTLE circuit 11 will be described.

FIG. 4 is a circuit diagram for explaining an example of the circuit configuration of the CTLE circuit of the equalizer circuit according to the first embodiment.

As shown in FIG. 4, the CTLE circuit 11 includes resistors R1, R2 and R3, transistors Tr1, Tr2, Tr3 and Tr4, and capacitors C1, C2 and C3. Transistors Tr1 to Tr4 are, for example, N-type transistors.

The transistor Tr1 includes a gate to which the reception signal RCV is supplied, a first terminal connected to a node N1, and a second terminal connected to a node N2. The resistor R1 includes a first terminal to which a voltage VDD is supplied and a second terminal connected to the node N1. The node N1 is a node from which the equalization signal /EQ1 is output. The voltage VDD is, for example, a power supply voltage and is a voltage for driving the CTLE circuit 11. The transistor Tr2 includes a first terminal connected to the node N2, a second terminal to which a voltage VSS is supplied, and a gate to which a signal SIG is supplied. The voltage VSS is, for example, a ground voltage (e.g., 0V) and is lower than the voltage VDD. The signal SIG is, for example, a signal for starting the operation of the CTLE circuit 11.

The transistor Tr3 includes a gate to which the reception signal /RCV is supplied, a first terminal connected to a node N3, and a second terminal connected to a node N4. The resistor R2 includes a first terminal to which the voltage VDD is supplied and a second terminal connected to the node N3. The node N3 is a node from which the equalization signal EQ1 is output. The transistor Tr4 includes a first terminal connected to the node N4, a second terminal to which the voltage VSS is supplied, and a gate to which the signal SIG is supplied.

The capacitor C1 includes a first terminal connected to the node N2 and a second terminal connected to node the N4. The resistor R3 includes a first terminal connected to the node N2 and a second terminal connected to the node N4. Between the node N2 and the node N4, the capacitor C1 and the resistor R3 are connected in parallel to each other.

The capacitor C2 includes a first terminal connected to the node N1 and a second terminal to which the voltage VSS is supplied. The capacitor C3 includes a first terminal connected to the node N3 and a second terminal to which the voltage VSS is supplied.

With the above configuration, the equalization signals /EQ1 and EQ1 are output from the nodes N1 and N3, respectively.

FIG. 5 is a diagram for explaining the equalization characteristic of the CTLE circuit of the equalizer circuit according to the first embodiment.

As shown in FIG. 5, the CTLE circuit 11 generates the equalization signal EQ1 by amplifying a gain of a high frequency band of the reception signal RCV more than a gain of a low frequency band. The boost amount B is defined, for example, as a difference between the gain of the low frequency band and the gain of the high frequency band in the equalizing characteristic of the CTLE circuit 11. The CTLE circuit 11 is configured to adaptively adjust its equalization characteristic in accordance with the boost amount B instructed by an external control circuit. Thereby, the CTLE circuit 11 can be set to have an optimum equalization characteristic in accordance with the reception signal RCV (that is, the transmission characteristic of the transmission path 4).

The CTLE circuit 11 directly amplifies the high frequency band of the reception signal RCV. Therefore, noise components included in the high frequency band may also be amplified. In order to remove the amplified noise components, it is preferable that the CTLE circuit 11 be used in combination with the DFE circuit 12 described later.

1.1.4 Configuration of DFE Circuit Next, a description will be given of a configuration of the DFE circuit 12.

1.1.4.1 Functional Configuration of DFE Circuit

First, a functional configuration of the DFE circuit of the equalizer circuit according to the first embodiment will be described.

FIG. 6 is a block diagram for explaining an example of the functional configuration of the DFE circuit of the equalizer circuit according to the first embodiment. As shown in FIG. 6, the DFE circuit 12 includes an adder 121, a determination circuit 122, a plurality of flip-flop circuits 123 (123-1, 123-2, . . . , 123-n) and a plurality of buffer circuits 124 (124-1, 124-2, . . . , 124-n).

The adder 121 adds each of feedback signals supplied from the corresponding buffer circuit 124 to equalization signals EQ1 and /EQ1, and transmits resultant signal to the determination circuit 122. Note that the adder 121 may output signals obtained by feedback to the outside of the DFE circuit 12 as the equalization signals EQ2 and /EQ2.

Upon receipt of the resultant signal from the adder 121, the determination circuit 122 determines whether each of a plurality of data included in the resultant signal is "0" or "1" in a corresponding section from the present to the past, and generates the determination signal DAT based on the determination results. It should be noted that each of the sections in which the signal is determined is determined based on the clock signal CLK separately input to the determination circuit 122. The determination circuit 122 transmits the generated determination signal DAT to the flip-flop circuits 123.

Each of the flip-flop circuits 123 holds a digital value associated with a corresponding section in the determination signal DAT, based on a clock signal DFECLK or /DFECLK generated by the DFE clock generation circuit 125. Specifically, for example, each of the flip-flop circuits 123-1, 123-2, . . . , and 123-n holds a digital value of a past time, which is one section, two sections, . . . , or n sections before the reference time, respectively. The flip-flop circuits 123-1, 123-2, . . . , and 123-n respectively outputs the held digital value to the buffer circuits 124-1, 124-2, . . . , and 124-n, and causes the buffer circuits 124-1, 124-2, . . . , and 124-n to hold the corresponding digital value.

Tap coefficients W1, W2, . . . , and Wn are respectively set in the buffer circuits 124-1, 124-2, . . . , and 124-n. Each of the buffer circuits 124-1, 124-2, . . . , and 124-n generates a feedback signal by multiplying the held digital value by the respective tap coefficients W1, W2, . . . , and Wn, and by inverting the multiplication result, and transmits the inverted result as the feedback signal to the adder 121.

In the description set forth below, a signal fed back to the input signal based on the determination signal DAT corresponding to the past time that is k sections before the reference time and the tap coefficient Wk will be referred to as a feedback signal of a k-th tap. For example, a feedback signal generated according to a determination signal DAT corresponding to the past time one section before and the tap coefficient W1 will be referred to as a feedback signal of a first tap (1st tap).

In this manner, the equalization signals EQ2 and /EQ2 in which inter-symbol interference is reduced can be generated by combining the feedback signals of the first tap to the n-th tap with the equalization signals EQ1 and /EQ1. Since the feedback signals are generated based on the determination signal DAT, noise is not amplified. Therefore, the DFE circuit 12 can reduce the influence of noise more than the CTLE circuit 11.

The DFE clock generation circuit 125 generates clock signals DFECLK and /DFECLK based on the clock signal CLK, and transmits the generated clock signals DFECLK and /DFECLK to the flip-flop circuits 123. Details of the DFE clock generation circuit 125 will be described later.

FIG. 7 is a further block diagram for explaining another example of the functional configuration of the DFE circuit of the equalizer circuit according to the first embodiment. In FIG. 7, the adder 121, flip-flop circuits 123 and buffer circuits 124 shown in FIG. 6 are illustrated as an input circuit 131 and a feedback circuit 132.

As shown in FIG. 7, the input circuit 131 includes input terminals to which the equalization signals EQ1 and /EQ1 are supplied and output terminals connected to nodes N0 and /N0. The input circuit 131 has a function of supplying signals corresponding to the equalization signals EQ1 and /EQ1 to the nodes N0 and /N0, respectively.

The feedback circuit 132 includes first input terminals to which the determination signals DAT (DAT90, /DAT90, DAT270, and /DAT270) are supplied, second input terminals to which the clock signals DFECLK and /DFECLK are supplied, and output terminals connected to nodes N0 and /N0. The feedback circuit 132 has a function of supplying the feedback signals of the first to n-th taps to the nodes N0 and /N0.

Various signals supplied from the input circuit 131 and the feedback circuit 132 are added together at the nodes N0 and /N0, and the equalization signals EQ2 and /EQ2 are output from the nodes N0 and /N0, respectively.

The clock signal CLK includes, for example, clock signals CLK90 and CLK270. The number appended to the clock signal CLK indicates that the phase of the clock signal is delayed by that number from the phase of reference clock signal CLK (also referred to as clock signal CLK0). That is, the clock signals CLK90 and CLK270 are signals whose phases are delayed by 90° and 270° from the clock signal CLK0 (not shown), respectively. Similarly, for example, a clock signal CLK180 (not shown) is a signal whose phase is delayed by 180° from the clock signal CLK0.

Upon receipt of the clock signals CLK90 and CLK270, the DFE clock generation circuit 125 generates the clock signals DFECLK and /DFECLK. The generated clock signals DFECLK and /DFECLK are supplied to the feedback circuit 132.

The determination circuit 122 includes determination circuits 122_1 and 122_2. The determination circuit 122_1 generates the determination signals DAT90 and /DAT 90, based on input signals supplied from the nodes N0 and /N0 and the clock signals CLK90 and CLK270, and supplies the generated determination signals DAT90 and /DAT 90 to the feedback circuit 132. The determination circuit 122_2 generates the determination signals DAT270 and /DAT270, based on input signals supplied from the nodes N0 and /N0 and the clock signals CLK90 and CLK270, and supplies the generated determination signals DAT270 and /DAT270 to the feedback circuit 132. The determination signals DAT90 and /DAT90 correspond to even-numbered data of a plurality of 1-bit data arranged in time series, and the determination signals DAT270 and /DAT270 correspond to odd-numbered data thereof. That is, the determination circuits 122_1 and 122_2 have a function of determining the even-numbered data and the odd-numbered data of the piece of the 1-bit data arranged in time series, respectively.

1.1.4.2 Circuit Configuration of DFE Circuit

Next, a circuit configuration of the equalizer circuit according to the first embodiment will be described.

FIG. 8 is a circuit diagram for explaining an example of the circuit configuration of the DFE circuit of the equalizer circuit according to the first embodiment. FIG. 8 shows an example of circuits corresponding to the input circuit 131 and the feedback circuit 132 of the DFE circuit 12 illustrated in FIG. 7.

As shown in FIG. 8, the input circuit 131 includes resistors R4 and R5, transistors Tr5 and Tr6, and a constant current source I1. The feedback circuit 132 includes transistors Tr7, Tr8, Tr9, Tr10, Tr11, Tr12, Tr13, Tr14, Tr15, Tr16, Tr17 and Tr18, and constant current sources I2 and I3. Transistors Tr5 to Tr18 are, for example, N-type transistors. The input circuit 131 and the feedback circuit 132 are connected to each other via the nodes N0 and /N0.

In the example shown in FIG. 8, the feedback circuit 132 is illustrated for the sake of simplicity such that only the portion which is included in the flip-flop circuits 123 and the buffer circuits 124 shown in FIG. 6 and which corresponds to the tap W1 (namely, the flip-flop circuit 123-1 and the buffer circuit 124-1) is shown. Although not shown in FIG. 8, portions corresponding to the other taps W2, W3, . . . , and Wn are realized by connecting configurations including transistors Tr7 to Tr18 and constant current sources I2 and I3 in parallel with the nodes N0 and /N0.

The transistor Tr5 includes a gate to which the equalization signal EQ1 is supplied, a first terminal connected to the node /N0, and a second terminal connected to a node N5. The resistor R4 includes a first terminal to which a power supply voltage VDD is supplied and a second terminal connected to the node /N0. The transistor Tr6 includes a gate to which the equalization signal /EQ1 is supplied, a first terminal connected to the node N0, and a second terminal connected to the node N5. The resistor R5 includes a first terminal to which the power supply voltage VDD is supplied and a second terminal connected to the node N0. The constant current source I1 includes an input terminal connected to the node N5 and an output terminal to which a power supply voltage VSS is supplied.

The transistor Tr7 includes a first terminal connected to the node N0, a second terminal connected to a node N6, and a gate to which the clock signal DFECLK is supplied. The transistor Tr8 includes a first terminal connected to the node /N0, a second terminal connected to a node N7, and a gate to which the clock signal DFECLK is supplied. The transistor Tr9 includes a first terminal to which the voltage VDD is supplied, a second terminal connected to the node N6, and a gate to which the clock signal /DFECLK is supplied. The transistor Tr10 includes a first terminal to which the voltage VDD is supplied, a second terminal connected to the node N7, and a gate to which the clock signal /DFECLK is supplied.

The transistor Tr11 includes a first terminal connected to the node N6, a second terminal connected to a node N8, and a gate to which the determination signal DAT90 is supplied. The transistor Tr12 includes a first terminal connected to the node N7, a second terminal connected to the node N8, and a gate to which the determination signal /DAT90 is supplied.

The constant current source I2 includes an input terminal connected to the node N8 and an output terminal to which the voltage VSS is supplied. That is, the constant current source I2 is configured to set such that a predetermined amount of current is supplied to the transistors Tr7 and Tr11 or the transistors Tr8 and Tr12. As a result, the constant current source I2 can pull down a voltage of the node N0 through a path including the transistors Tr7 and Tr11 and can pull down a voltage of the node /N0 through a path including the transistors Tr8 and Tr12. That is, the constant current source I2 can set the tap coefficient W1 used when the levels of the determination signals DAT90 and /DAT 90 are fed back to the nodes N0 and /N0, respectively.

With the above configuration, the transistors Tr7 to Tr12 and the constant current source I2 can feed back the feedback signal of the first tap to the even-numbered data of the pieces of 1-bit data arranged in time series.

The transistor Tr13 includes a first terminal connected to the node /N0, a second terminal connected to a node N9, and a gate to which the clock signal /DFECLK is supplied. The transistor Tr14 includes a first terminal connected to the node N0, a second terminal connected to a node N10, and a gate to which the clock signal /DFECLK is supplied. The transistor Tr15 includes a first terminal to which the voltage VDD is supplied, a second terminal connected to the node N9, and a gate to which the clock signal DFECLK is supplied. The transistor Tr16 includes a first terminal to which the voltage VDD is supplied, a second terminal connected to the node N10, and a gate to which the clock signal DFECLK is supplied.

The transistor Tr17 includes a first terminal connected to the node N9, a second terminal connected to a node N11, and a gate to which the determination signal /DAT270 is supplied. The transistor Tr18 includes a first terminal connected to the node N10, a second terminal connected to the node N11, and a gate to which the determination signal DAT270 is supplied. The constant current source I3 includes an input terminal connected to the node N11 and an output terminal to which the voltage VSS is supplied. That is, the constant current source I3 is configured to set such that a predetermined amount of current is supplied to the transistors Tr13 and Tr17 or the transistors Tr14 and Tr18. As a result, the constant current source I3 can pull down the voltage of the node /N0 through a path including the transistors Tr13 and Tr17 and can pull down the voltage of node N0 through a path including the transistors Tr14 and Tr18. That is, the constant current source I3 can set the tap coefficient W1 used when the levels of the determination signals DAT270 and /DAT270 are fed back to the nodes N0 and /N0, respectively.

With the above configuration, the transistors Tr13 to Tr18 and the constant current source I3 can feed back the feedback signal of the first tap to the odd-numbered data of the pieces of 1-bit data arranged in time series.

With the above configuration, the input circuit 131 and the feedback circuit 132 can output the equalization signals EQ2 and /EQ2 from the nodes N0 and /N0, respectively.

1.1.5 Configuration of DFE Clock Generation Circuit

Next, a configuration of the DFE clock generation circuit of the equalizer circuit according to the first embodiment will be described.

FIG. 9 shows circuit diagrams for explaining an example of the circuit configuration of the DFE clock generation circuit of the equalizer circuit according to the first embodiment. Specifically, examples of circuit diagrams for generating the clock signals DFECLK and /DFECLK are shown in an upper portion P1 of FIG. 9 and a lower portion P2 of FIG. 9, respectively.

As shown in the upper portion P1 of FIG. 9, the portion of the DFE clock generation circuit 125 that generates the clock signal DFECLK includes a logic circuit OR1, transistors Tr19 and Tr20, and a constant current source 14. The Transistor Tr19 is, for example, a P-type transistor, and the transistor Tr20 is, for example, an N-type transistor.

The logic circuit OR1 is an AND circuit, and when the clock signal CLK270 and a clock signal CLK270_D are input, it outputs a clock signal CLK270_OR which is a logical product of the clock signals CLK270 and CLK270_D. The clock signal CLK270_D is a signal delayed from the clock signal CLK270 by a predetermined phase. The transistor Tr19 includes a first terminal to which the voltage VDD is supplied, a second terminal connected to a node N12, and a gate to which the clock signal CLK270_OR is supplied. The transistor Tr20 includes a first terminal connected to the node N12, a second terminal connected to an input terminal of the constant current source 14, and a gate to which the clock signal CLK270_OR is supplied. The constant current source 14 includes an output terminal to which the voltage VSS is supplied. That is, the constant current source 14 is configured to set such that a predetermined amount of current is supplied to the transistor Tr20.

With the above configuration, the DFE clock generation circuit 125 can output the clock signal DFECLK from node N12, based on the clock signal CLK270.

As shown in the lower portion P2 of FIG. 9, the portion of the DFE clock generation circuit 125 that generates the clock signal /DFECLK includes a logic circuit OR2, transistors Tr21 and Tr22, and a constant current source 15. The transistor Tr21 is, for example, a P-type transistor, and the transistor Tr22 is, for example, an N-type transistor.

The logic circuit OR2 is an AND circuit, and when the clock signal CLK90 and a clock signal CLK90_D are input, it outputs a clock signal CLK90_OR which is a logical product of the clock signals CLK90 and CLK90_D. The clock signal CLK90_D is a signal delayed from the clock signal CLK90 by a predetermined phase. The transistor Tr21 includes a first terminal to which the voltage VDD is supplied, a second terminal connected to a node N13, and a gate to which the clock signal CLK90_OR is supplied. The transistor Tr22 includes a first terminal connected to the node N13, a second terminal connected to an input terminal of the constant current source 15, and a gate to which the clock signal CLK90_OR is supplied. The constant current source 15 includes an output terminal to which the voltage VSS is supplied. That is, the constant current source 15 is configured to set such that a predetermined amount of current is supplied to the transistor Tr22.

With the above configuration, the DFE clock generation circuit 125 can output the clock signal /DFECLK from the node N13, based on the clock signal CLK90.

1.2 Operation

Next, an operation of the equalizer circuit according to the first embodiment will be described.

1.2.1 Operation of DFE Clock Generation Circuit

First, an operation of the DFE clock generation circuit of the equalizer circuit according to the first embodiment will be described.

FIG. 10 is a timing chart for explaining an example of the operation of the DFE clock generation circuit of the equalizer circuit according to the first embodiment. In FIG. 10, the relationship between the input and output signals for the clock signal DFECLK, which is one of the clock signals generated by the DFE clock generation circuit 125, is shown by way of example. It should be noted that the relationship between the input and output signals for the clock signal /DFECLK is similar to the relationship between the input and output signals for the clock signal DFECLK except that it is logically inverted, so that a description thereof will be omitted.

As shown in FIG. 10, the clock signals CLK270 and CLK270_D are input to the logic circuit OR1. The clock signal CLK270 rises toward "H (High)" level at time t1, falls toward "L (Low)" level at time t2, rises toward the "H" level at time t3, and falls toward "L" level at time t4. In this manner, the level of the clock signal CLK270 switches in a certain period T (=(t2−t1)=(t3−t2)=(t4−t3)). The level of the clock signal CLK270_D switches, with its phase delayed from that of the clock signal CLK270 by a predetermined delay D (=(t1$d$−t1)=(t2$d$−t2)=(t3$d$−t3)=(t4$d$−t4)).

The logic circuit OR1 outputs a result of logical product of the clock signals CLK270 and CLK270_D as the clock signal CLK270_OR. That is, the clock signal CLK270_OR rises toward "H" level at time t1, falls toward "L" level at time t2$d$, rises toward the "H" level at time t3, and falls toward "L" level at time t4$d$.

The transistors Tr19 and Tr20 function as inverters and output the clock signal DFECLK. That is, the clock signal DFECLK switches from "L" level toward "H" level when the clock signal CLK270_OR switches from "H" level toward "L" level (for example, at time t2$d$). The clock signal DFECLK switches from "H" level toward "L" level when the clock signal CLK270_OR switches from "L" level toward "H" level (for example, at time t3).

It should be noted that only the transistor Tr19 is connected between the voltage VDD and the node N12. As a result, at time t2$d$, the clock signal DFECLK can quickly switch from "L" level toward "H" level. Therefore, a rising edge REdfe of the clock signal DFECLK has a time constant similar to that of a rising edge REclk of the clock signal CLK270_OR. On the other hand, not only the transistor Tr2 but also the constant current source 14 are connected between the voltage VSS and the node N12, As a result, at time t3, the speed at which the clock signal DFECLK switches from "H" level to "L" level is limited by the constant current source 14. Therefore, a falling edge FEdfe of the clock signal DFECLK is configured to set to have a larger time constant than a falling edge FEclk of the clock signal CLK270_OR.

Since the clock signal DFECLK is an inverted signal of the clock signal CLK270_OR, as described above, a period during which the clock signal DFECLK maintains "H" level is shorter than that of the clock signal CLK270 (the period T). More specifically, for example, the clock signal DFECLK rises from "L" level toward "H" level at time t2$d$, maintains "H" level for the period (T−D), and starts to fall from "H" level to "L" level at time t3. The clock signal DFECLK describes a waveform such that it gently attenuates due to the large time constant in a later period T (that is, from time t3 to time t3$d$). This is different from the waveform of clock signal CLK270 that maintains "H" level throughout the period T.

1.2.2 Operation of DFE Circuit

Next, an operation of the DFE circuit of the equalizer circuit according to the first embodiment will be described.

Figure 11:
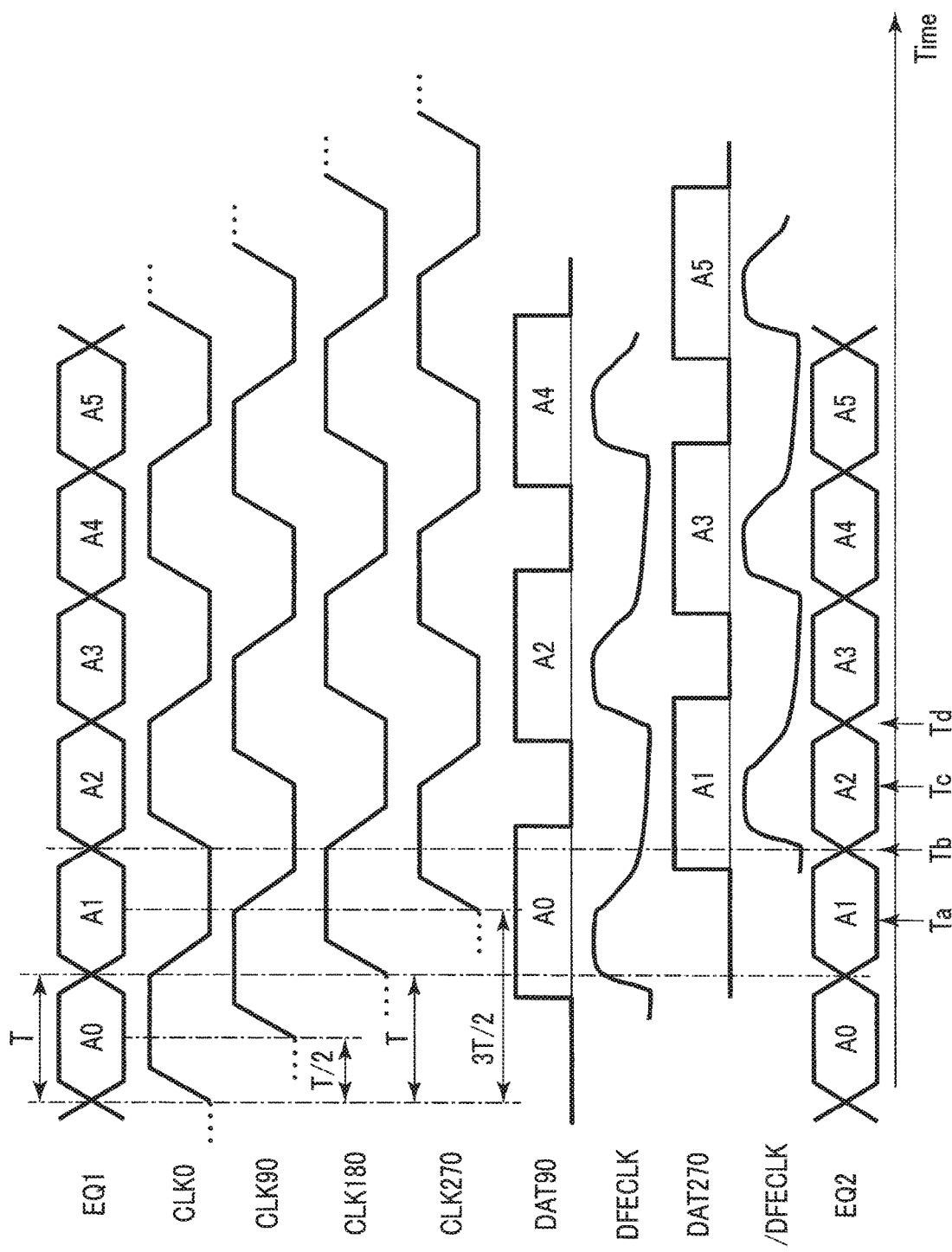
FIG. 11 is a timing chart for explaining an operation of the DFE circuit of the equalizer circuit according to the first embodiment.

FIG. 11 is a timing chart for explaining an example of the operation of the DFE circuit of the equalizer circuit according to the first embodiment. In the example shown in FIG. 11, a digital value of the time one section before the reference time is fed back to the equalization signal EQ1 in the DFE circuit 12, and the equalization signal EQ2 is generated thereby.

As shown in FIG. 11, the equalization signals EQ1 and EQ2 include 1 bit of (encoded) data for each period T, for example. In the example shown in FIG. 11, the same data string (that is, a sequence of a plurality of one-bit data A0, A1, A2, A3, A4, A5, . . . arranged in chronological order) is included in the equalization signals EQ1 and EQ2. In the example shown in FIG. 11, the equalization signals EQ1 and EQ2 are illustrated on the same time axis. More specifically, for example, in the equalization signals EQ1 and EQ2, data A2 starts at time Tb and ends at time Td. That is, times Tb and Td correspond to the edge portions of the waveform of data A2. Time Ta and time Tc correspond to intermediate times of the periods corresponding to data A1 and data A2, respectively. That is, times Ta and Tc correspond to the sampling times of the sampler circuit 13 when data A1 and data A2 are determined, respectively.

Clock signals CLK (CLK0, CLK90, CLK180 and CLK270) are input to the DFE circuit 12. The clock signal CLK0 is synchronized with the equalization signal EQ1, and the clock signals CLK90, CLK180 and CLK270 are respectively delayed in phase by 90°, 180° and 270° with respect to the clock signal CLK0 (that is, by T/2, T, and 3T/2).

The determination circuit 122_1 determines portions of the equalization signal EQ1 corresponding to the even-numbered data A0, A2, A4, . . . , assuming that counting starts from 0 with the timing synchronized with the clock signal CLK0, and outputs the determination signal DAT90. The clock signal DFECLK and the determination signal DAT90 are generated, for example, in synchronization with the same clock signal CLK0. For this reason, activated clock signal DFECLK is input to the feedback circuit 132 at the timing when the determination signal DAT90 is input from the determination circuit 122_1 (see FIG. 7).

In the case where the determination signal DAT90 corresponding to the even-numbered data A0, A2, A4, . . . is at the "H" level, the feedback circuit 132 pulls down the voltage of the node N0 via the transistors Tr7 and Tr11, as shown in FIG. 8. On the other hand, when the determination signal /DAT 90 is at the "H" level, the feedback circuit 132 pulls down the voltage of the node /N0 via the transistors Tr8 and Tr12. The amount by which the nodes N0 and /N0 are pulled down is adjusted by the constant current source I2.

As described above, the feedback circuit 132 feeds back a determination signal of the time one section before the reference time to the equalization signal EQ2. Therefore, the timings at which the determination signals DAT90 and /DAT90 corresponding to data A0 are input are synchronized with the timings at which the equalization signals EQ2 and /EQ2 corresponding to data A1 are output from the nodes N0 and /N0. For this reason, the equalization signals EQ2 and /EQ2 corresponding to data A1 are output as values obtained by feeding back the determination signals DAT90 and /DAT90 corresponding to data A0 in accordance with the tap coefficient W1 set by the constant current source I2.

Likewise, the determination circuit 122_2 determines portions of the equalization signal EQ1 corresponding to the odd-numbered data A1, A3, A5, . . . , assuming that counting starts from 0 with the timing synchronized with the clock signal CLK0, and outputs the determination signal DAT270. The clock signal /DFECLK and the determination signal DAT270 are generated, for example, in synchronization with the same clock signal CLK0. For this reason, activated clock signal /DFECLK is input to the feedback circuit 132 at the timing when the determination signal DAT270 is input from the determination circuit 122_2 (see FIG. 7).

In the case where the determination signal DAT270 corresponding to the odd-numbered data A1, A3, A5, . . . is at the "H" level, the feedback circuit 132 pulls down the voltage of the node N0 via the transistors Tr14 and Tr18, as shown in FIG. 8. On the other hand, when the determination signal /DAT270 is at the "H" level, the feedback circuit 132 pulls down the voltage of the node /N0 via transistors the Tr13 and Tr17. The amount by which the nodes N0 and /N0 are pulled down is adjusted by the constant current source I3.

As described above, the feedback circuit 132 feeds back a determination signal of the time which is one section before the reference time to the equalization signal EQ2. Therefore, the timings at which the determination signals DAT270 and /DAT270 corresponding to data A1 are input are synchronized with the timings at which the equalization signals EQ2 and /EQ2 corresponding to data A2 are output from the nodes N0 and /N0. For this reason, the equalization signals EQ2 and /EQ2 corresponding to data A2 are output as values obtained by feeding back the determination signals DAT270 and /DAT270 corresponding to data A1 in accordance with the tap coefficient W1 set by the constant current source I3.

The sampler circuit 13 determines data included in the equalization signals EQ2 and /EQ2 generated by the above operation. As described above, for example, the sampler circuit 13 samples the equalization signal EQ2 corresponding to data A1 and A2 at times Ta and Tc, and generates the respective sampling results Ds.

By the operating described above, the equalizer circuit 10 according to the present embodiment can output the sampling results Ds, based on the input reception signal RCV.

1.2.3 Response Characteristics of Circuit

Next, response characteristics of the equalizer circuit according to the first embodiment will be described.

Figure 12:
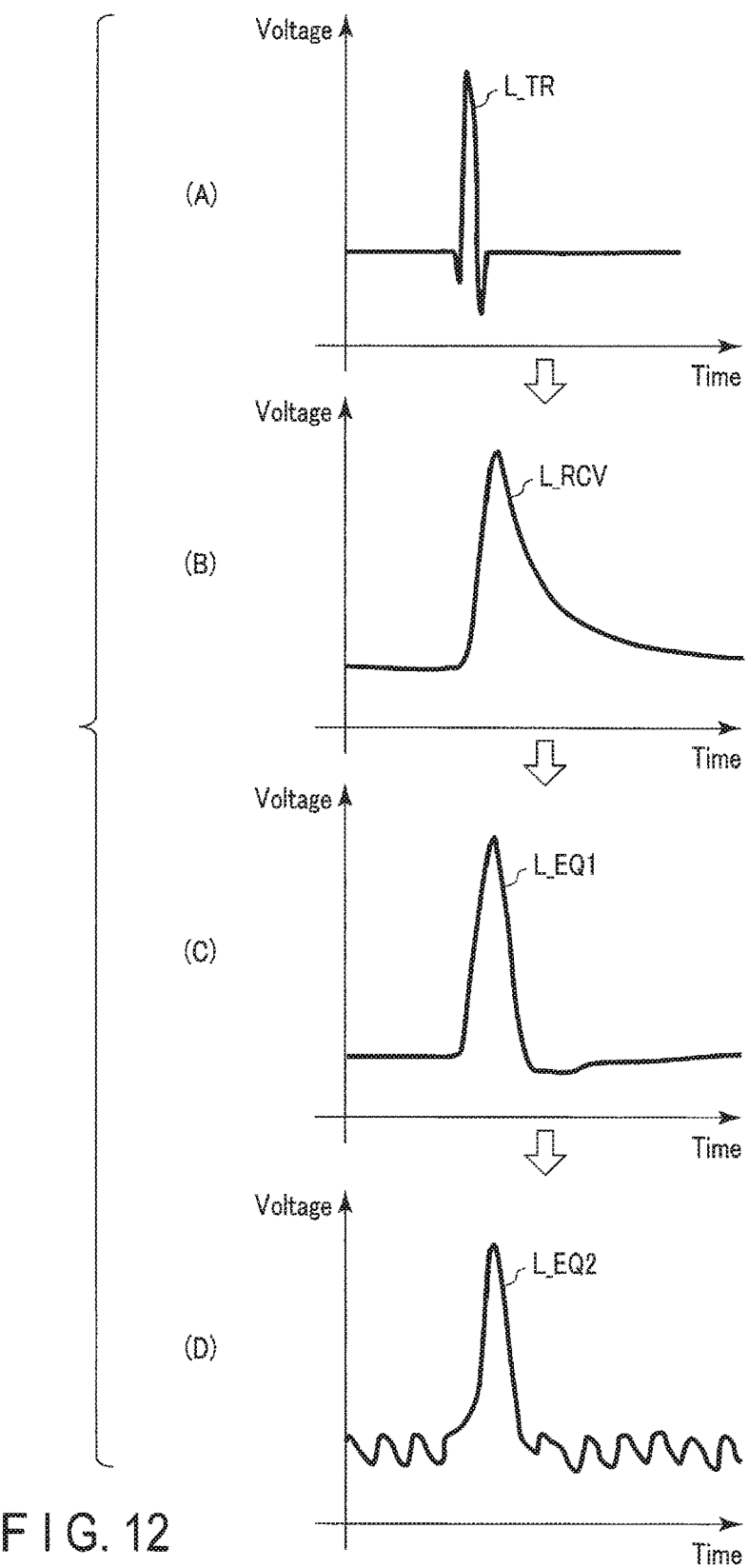
FIG. 12 shows diagrams for explaining a response characteristic of the equalizer circuit according to the first embodiment.

FIG. 12 shows diagrams for explaining response characteristics of the equalizer circuit according to the first embodiment. In FIG. 12, impulse responses of various signals input to the equalizer circuit 10 are shown, with a time plotted on the abscissa and a voltage plotted on the ordinate. More specifically, a first column (A) of FIG. 12 shows an example of a waveform of a transmission signal TR when the transmission signal TR as an impulse signal is transmitted from the transmission circuit 2. A second column (B) of FIG. 12 shows an example of a waveform of a reception signal RCV obtained by passing the impulse waveform shown in the first column (A) of FIG. 12 through the transmission path 4. The third column (C) of FIG. 12 shows an example of a waveform of an equalization signal EQ1 obtained by compensating the reception signal RCV shown in the second column (B) of FIG. 12 by the CTLE circuit 11. The fourth column (D) of FIG. 12 shows an example of a waveform of an equalization signal EQ2 is obtained by compensating the equalization signal EQ1 shown in the third column (C) of FIG. 12 by the DFE circuit 12.

As shown in the first column (A) of FIG. 12, the transmission circuit 2 transmits a signal L_TR as the impulse signal to the reception circuit 6 via the transmission path 4.

Subsequently, as shown in the second column (B) of FIG. 12, the transmission path 4 converts the signal L_TR into a signal L_RCV in which the gain in the high frequency band of the signal L_TR is attenuated. For this reason, the signal L_RCV is converted into a signal such that a time constant is large at the falling portion of the impulse. The reception circuit 6 receives the signal L_RCV instead of the impulse signal.

Subsequently, as shown in the third column (C) of FIG. 12, the CTLE circuit 11 of the equalizer circuit 10 amplifies the high frequency band of the signal L_RCV and generates a signal L_EQ1 as the equalization signal EQ1. The signal L_EQ1 is converted into a signal such that the falling portion of the impulse is sharper than that of the signal L_RCV. However, since the CTLE circuit 11 amplifies the noise included in the high frequency band of the signal L_RCV, the amplified noise may be included in the signal L_EQ1. Therefore, the signal L_EQ1 is generated such that the amount of signal amplification by the CTLE circuit 11 is suppressed to a possible degree.

Subsequently, as shown in the fourth column (D) of FIG. 12, the DFE circuit 12 of the equalizer circuit 10 generates a signal L_EQ2 as the equalization signal EQ2, based on the signal L_EQ1. The signal L_EQ2 is converted such that it is closer in shape to the signal L_TR than the signal L_EQ1. The signal L_EQ2 may undergo vibration in the time regions other than the peak portion corresponding to the impulse response, but since the vibration has small amplitude, the adverse effect on other signals is small. For this reason, it is possible to further reduce errors remaining in the signal.

1.3 Advantageous Effects of Present Embodiment

According to the first embodiment, the impulse response characteristics of the DFE circuit can be improved. A description will be given of the advantages.

The DFE clock generation circuit 125 generates the clock signals DFECLK and /DFECLK which function as windows (feedback periods) in which the determination signal DAT of past data is fed back. The clock signals DFECLK and /DFECLK are generated not to be rectangular waves but to have shapes having a time constant of a falling edge larger than a time constant of rising edge. In addition, the clock signals DFECLK and /DFECLK are generated such that the period from the rise to the fall of the clock signals DFECLK and /DFECLK is shorter than the period from the rise to the fall of the clock signal CLK (e.g., clock signal CLK270). As a result, the feedback circuit 132 does not feedback a constant value to the equalization signals EQ2 and /EQ2 throughout the feedback period, but can change the feedback amount according to the shapes of the clock signals DFECLK and /DFECLK. More specifically, the feedback amount for the equalization signals EQ2 and /EQ2 rapidly increases in the first half of the feedback period and gently decreases in the latter half. It is therefore possible to reduce errors more adaptively so that no residual error remains in the waveform of the fall of the signal L_EQ2.

Figure 13:
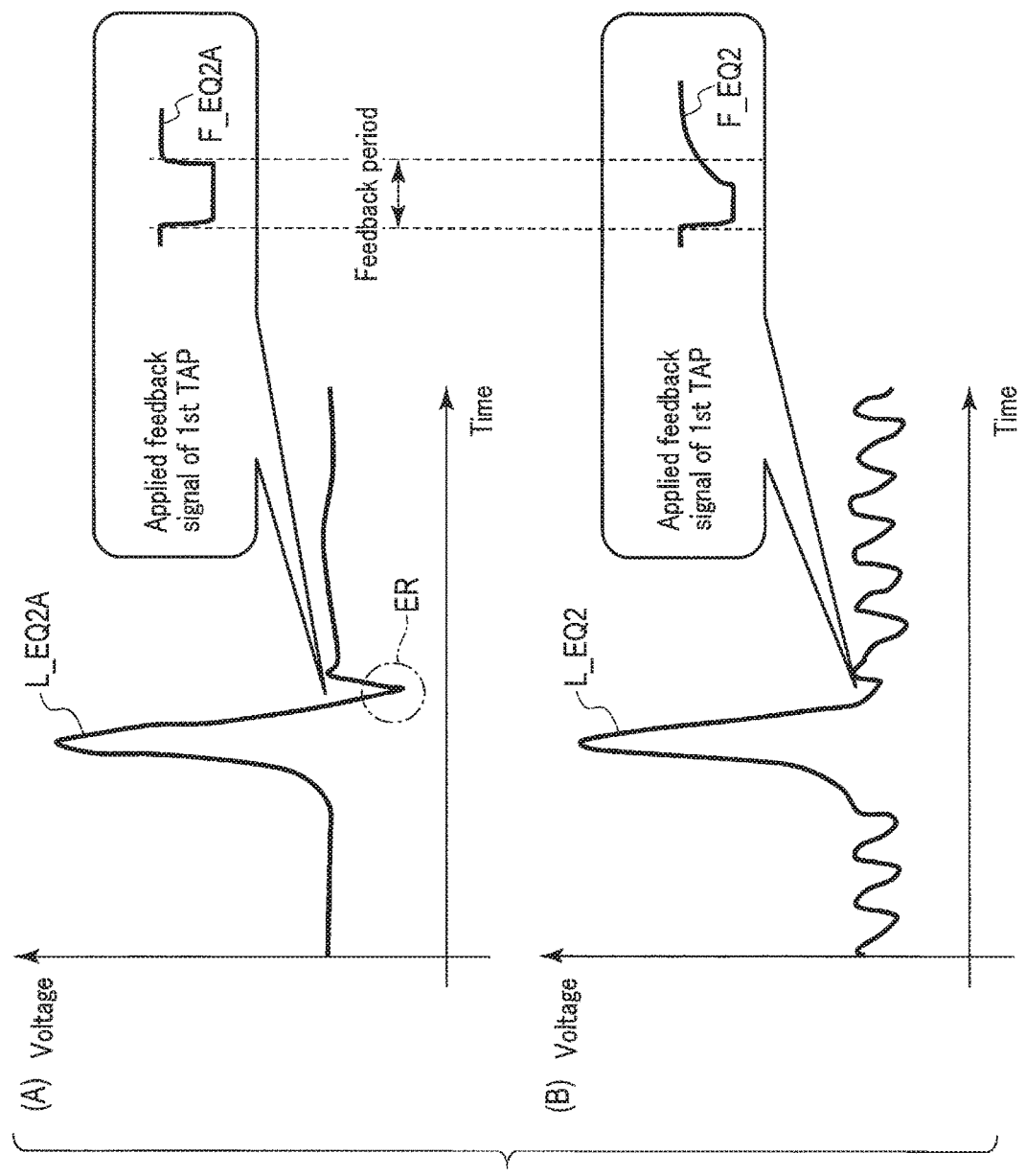
FIG. 13 shows diagrams for explaining advantages of the equalizer circuit according to the first embodiment.

FIG. 13 shows diagrams for explaining the advantages of the first embodiment. In an upper portion (A) of FIG. 13, a feedback signal F_EQ2A of the first tap generated based on the clock signals DFECLK and /DFECLK having a rectangular shape and a signal L_EQ2A equalized by the feedback signal F_EQ2A of the first tap are shown. In a lower portion (B) of FIG. 13, a feedback signal F_EQ2 of the first tap generated based on the clock signals DFECLK and /DFECLK according to the first embodiment and a signal L_EQ2 equalized by the feedback signal F_EQ2 of the first tap are shown.

As shown in the upper portion (A) of FIG. 13, where the clock signals DFECLK and /DFECLK have a rectangular shape, the magnitude of the first feedback signal is substantially constant throughout the feedback period. Therefore, by subtracting the rectangular feedback signal of the first tap from the equalization signal EQ2, the signal L_EQ2 A has an error portion ER which is excessively fed back by the feedback signal.

On the other hand, as shown in the lower portion (B) of FIG. 13, where the clock signals DFECLK and /DFECLK have a falling shape with a large time constant in the latter half of the feedback period, the magnitude of the first feedback signal decreases gently in the latter half of the feedback period. Therefore, by subtracting the feedback signal of the first tap, the latter half portion of which gradually decreases, from the equalization signal EQ2, excessive feedback can be suppressed at the edge portions of data.

It is therefore possible to reduce the residual error of the impulse response, and eventually to improve the impulse response characteristics of the DFE circuit.

2. Second Embodiment

Next, an equalizer circuit according to a second embodiment will be described. The second embodiment differs from the first embodiment in that the shapes of the clock signals DFECLK and /DFECLK can be changed by controlling the magnitude of a time constant of a falling edge. In the explanation that follows, mainly those configurations and operations that are different from those of the first embodiment will be explained, and the explanation of similar configurations and operations will be omitted.

2.1 Configurations 2.1.1 Configuration of Equalizer Circuit

A configuration example of the equalizer circuit according to the second embodiment will be described.

FIG. 14 is a block diagram for explaining an example of a functional configuration of the equalizer circuit according to the second embodiment. FIG. 14 corresponds to FIG. 3 explained in the first embodiment. As shown in FIG. 14, the equalizer circuit 10 further includes an error sampler circuit 14 and a control circuit 15, and includes a DFE circuit 12a instead of the DFE circuit 12.

The error sampler circuit 14 determines data included in the equalization signal EQ2 and generates error sampling results De. The configuration of the error sampler circuit 14 is similar to that of the sampler circuit 13. However, the error sampler circuit 14 differs from the sampler circuit 13 in that it does not use a reference voltage (0V (i.e., the voltage VSS)) used when the sampler circuit 13 samples the equalization signal EQ2, but uses a voltage VREF offset from the voltage VSS. That is, the error sampler circuit 14 can determine the data included in the equalization signal EQ2, depending on whether or not the equalization signal EQ2 is greater than the voltage VREF.

Upon receipt of the sampling results Ds generated by the sampler circuit 13 and the error sampling results De generated by the error sampler circuit 14, the control circuit 15 generates a time constant signal C_t and a tap coefficient signal C_wk based on the sampling results Ds and the error sampling results De, and outputs the generated signals to the DFE circuit 12a. The time constant signal C_t and the tap coefficient signal C_wk (C_w1, C_w2, . . . , C_wk, . . . , C_wn) are configured to be capable of controlling a time constant of the clock signal DFECLK, and a tap coefficient Wk (W1, W2, . . . , Wk, . . . , Wn) of the DFE circuit 12a, respectively. The time constant signal C_t and the tap coefficient signal C_wk are, for example, signals designating a DAC value, and can respectively change the time constant of the falling edge of the clock signal DFECLK and the tap coefficient Wk of the DFE circuit 12a in a stepwise manner.

2.1.2 Configuration of DFE Circuit

Next, a configuration of the DFE circuit of the equalizer circuit according to the second embodiment will be described.

FIG. 15 is a circuit diagram for explaining an example of a circuit configuration of the DFE circuit of the equalizer circuit according to the second embodiment.

FIG. 15 corresponds to FIG. 8 explained in the first embodiment, and shows a case where a feedback circuit 132a is provided instead of the feedback circuit 132. In FIG. 15, only a portion having the function of feeding back a feedback signal of the first tap to the nodes N0 and /N0, of feedback circuit 132a is shown for the sake of simplicity, as in FIG. 8.

As shown in FIG. 15, the feedback circuit 132a according to the second embodiment includes variable current sources I2A and I3A in place of the constant current sources I2 and I3 included in the feedback circuit 132 according to the first embodiment. That is, the variable current source I2A includes an input terminal connected to the node N8 and a second terminal to which the voltage VSS is supplied. The variable current source I3A includes an input terminal connected to the node N11 and a second terminal to which the voltage VSS is supplied.

Upon receipt of the tap coefficient signal C_w1 supplied from the control circuit 15, the variable current sources I2A and I3A can respectively adjust the magnitudes of the currents flowing from the variable current sources I2A and I3A in accordance with the tap coefficient signal C_w1. As a result, the variable current source I2A can adaptively set the amount of current supplied to the transistors Tr7 and Tr11 and the amount of current supplied to the transistors Tr8 and Tr2, when the paths between the nodes N0 and /N0 and the node N8 are formed, and can eventually adjust the amount by which the potential of the node N0 and /N0 are pulled down. In addition, the variable current source I3A can adaptively set the amount of current supplied to the transistors Tr14 and Tr18 and the amount of current supplied to the transistors Tr13 and Tr17, when paths between the nodes N0 and /N0 and node N1 are formed, and can eventually adjust the amount by which the potential of the node N0 and /N0 are pulled down. That is, the variable current sources I2A and I3A can adjust the tap coefficient W1 of the DFE circuit 12a in accordance with the tap coefficient signal C_w1.

In the description set forth below, it is assumed for the sake of convenience that the amount of current flowing to the variable current sources I2A and I3A increases and decreases in accordance with an increase and a decrease of the tap coefficient signal C_w1, and eventually increases and decreases the tap coefficient W1, respectively.

2.1.3 Configuration of DFE Clock Generation Circuit

Next, a configuration of a DFE clock generation circuit of the equalizer circuit according to the second embodiment will be described.

FIG. 16 shows circuit diagrams for explaining an example of a circuit configuration of the DFE clock generation circuit of the equalizer circuit according to the second embodiment. Specifically, examples of circuit diagrams for generating the clock signals DFECLK and /DFECLK are shown in an upper portion P1a of FIG. 16 and a lower portion P2a of FIG. 16, respectively. The upper portion P1a and the lower portion P2a of FIG. 16 respectively correspond to the upper portion P1 and lower portion P2 of FIG. 9 explained in the first embodiment.

As shown in FIG. 16, a DFE clock generation circuit 125a according to the second embodiment includes variable current sources I4A and I5A, instead of the constant current sources I4 and I5 included in the DFE clock generation circuit 125 according to the first embodiment. That is, as shown in the upper portion P1a of FIG. 16, the variable current source I4A includes an input terminal connected to the second terminal of transistor Tr20 and an output terminal to which the voltage VSS is supplied. As shown in the lower portion P2a of FIG. 16, the variable current source I5A includes an input terminal connected to the second terminal of transistor Tr22 and an output terminal to which the voltage VSS is supplied.

Upon receipt of the time constant signal C_t supplied from the control circuit 15, the variable current sources I4A and I5A can respectively adjust the magnitudes of the currents flowing to the variable current sources I4A and I5A in accordance with the time constant signal C_t. As a result, the DFE clock generation circuit 125a can adaptively set the amount of current supplied to the transistors Tr20, when a path between the nodes N12 and the variable current source I4A is formed, and can eventually adjust the amount by which the potential of the node N12 is pulled down. In addition, the DFE clock generation circuit 125a can adaptively set the current supplied to the transistor Tr22, when a path between the node N13 and the variable current source I5A is formed, and can eventually adjust the amount by which the potential of the node N13 is pulled down. That is, the variable current sources I4A and I5A can respectively adjust the time constant of the falling edge of the clock signals DFECLK and /DFECLK in accordance with the time constant signal C_t.

In the description set forth below, it is assumed for the sake of convenience that the amount of current flowing to the variable current sources I4A and I5A increases and decreases according to an increase and a decrease of the time constant signal C_t, and eventually increases and decreases the time constant of the falling edge of the clock signals DFECLK and /DFECLK, respectively.

2.2 Operation

Next, an operation of the equalizer circuit according to the second embodiment will be described.

2.2.1 Control Operation of Equalizer Circuit

First, a control operation of the equalizer circuit according to the second embodiment will be described with reference to FIG. 17.

Figure 17:
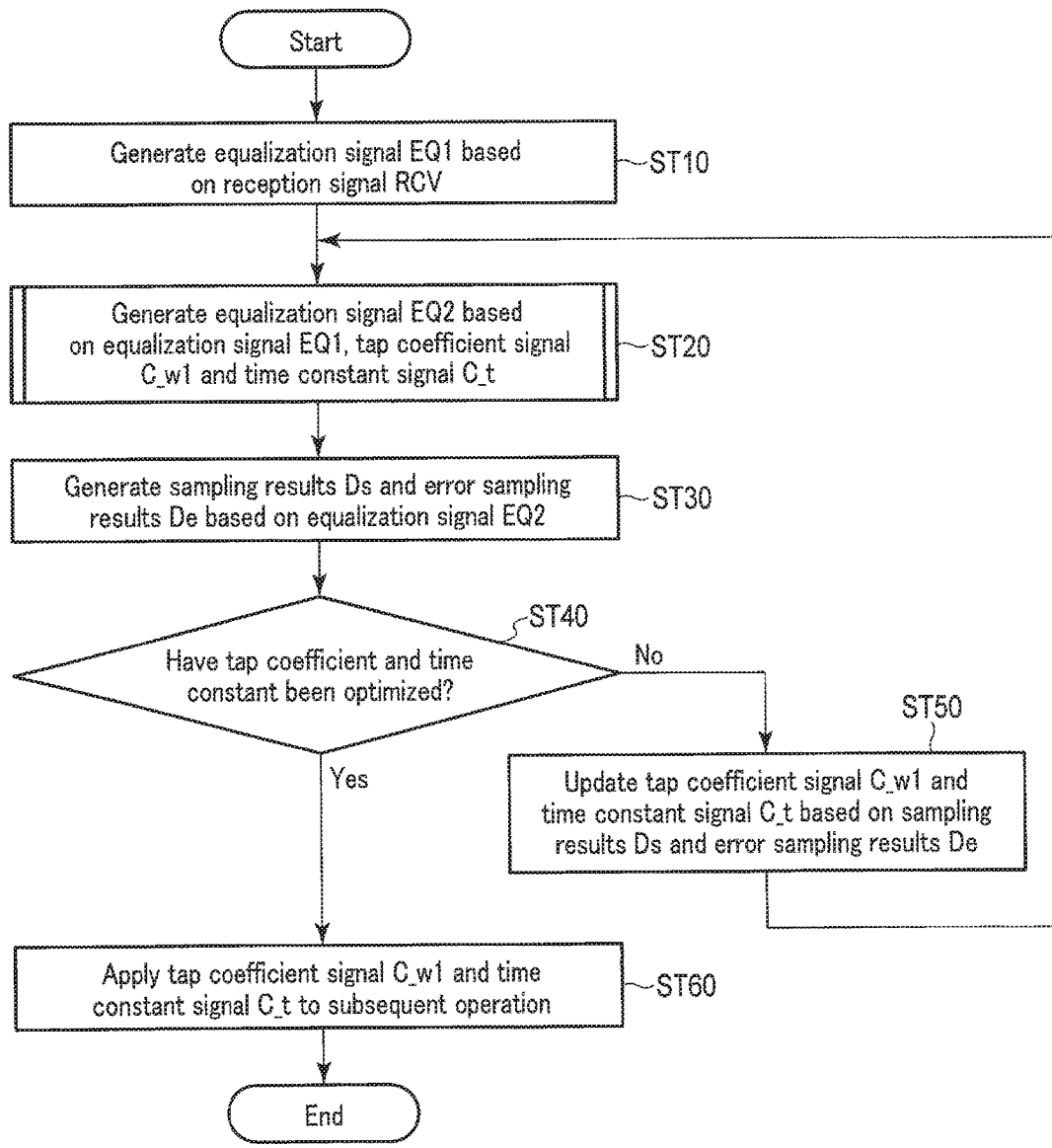
FIG. 17 is a flowchart for explaining a control operation of the equalizer circuit according to the second embodiment.

FIG. 17 is a flowchart for explaining the control operation of the equalizer circuit according to the second embodiment. FIG. 17 schematically shows an operation that is performed from the receipt of reception signal RCV by the reception circuit 6 to the output of optimally equalized equalization signal EQ2. In the description below, it is assumed that the control circuit 15 supplies a predetermined tap coefficient signal C_wk and an initial value of time constant signal C_t to the DFE circuit 12a. The initial value may not have an optimum impulse response characteristic with respect to a reception signal RCV.

As shown in FIG. 17, in ST10, upon receipt of the reception signal RCV, the CTLE circuit 11 performs linear equalization on the reception signal RCV to generate an equalization signal EQ1. The generated equalization signal EQ1 is supplied to the DFE circuit 12a.

In ST20, upon receipt of the equalization signal EQ1, the DFE circuit 12a performs nonlinear equalization on the equalization signal EQ1, using the tap coefficient signal C_w1 and the time constant signal C_t supplied from the control circuit 15, and thereby generates an equalization signal EQ2. Details of the operation of generating the equalization signal EQ2 will be described later. The generated equalization signal EQ2 is supplied to the sampler circuit 13 and the error sampler circuit 14.

In ST30, the sampler circuit 13 and the error sampler circuit 14 respectively generate sampling results Ds and error sampling results De, based on the equalization signal EQ2. The generated sampling results Ds and error sampling results De are supplied to the control circuit 15.

In ST40, the control circuit 15 determines whether or not the tap coefficient W1 and the time constant of the clock signal DFECLK have been optimized based on the sampling results Ds and the error sampling results De. If it is determined that the tap coefficient W1 and the time constant of the clock signal DFECLK have not been optimized (ST40; no), the process proceeds to ST50. If it is determined that the tap coefficient W1 and the time constant of the clock signal DFECLK have been optimized (ST40; yes), the process proceeds to ST60.

In ST50, the control circuit 15 updates the tap coefficient signal C_w1 and the time constant signal C_t according to a predetermined algorithm, based on the sampling results Ds and the error sampling results De. Details of the control operation for updating the tap coefficient signal C_w1 and the time constant signal C_t will be described later. The updated tap coefficient signal C_w1 and time constant signal C_t are supplied to the DFE circuit 12a, and the process repeats ST20 to ST40.

In ST60, the control circuit 15 applies, to the subsequent operation, the tap coefficient signal C_w1 and the time constant signal C_t, which may generate the tap coefficient signal W1 and the time constant of the clock signal DFECLK determined to be optimized.

In this manner, the control operation of the equalizer circuit 10 is completed.

Figure 18:
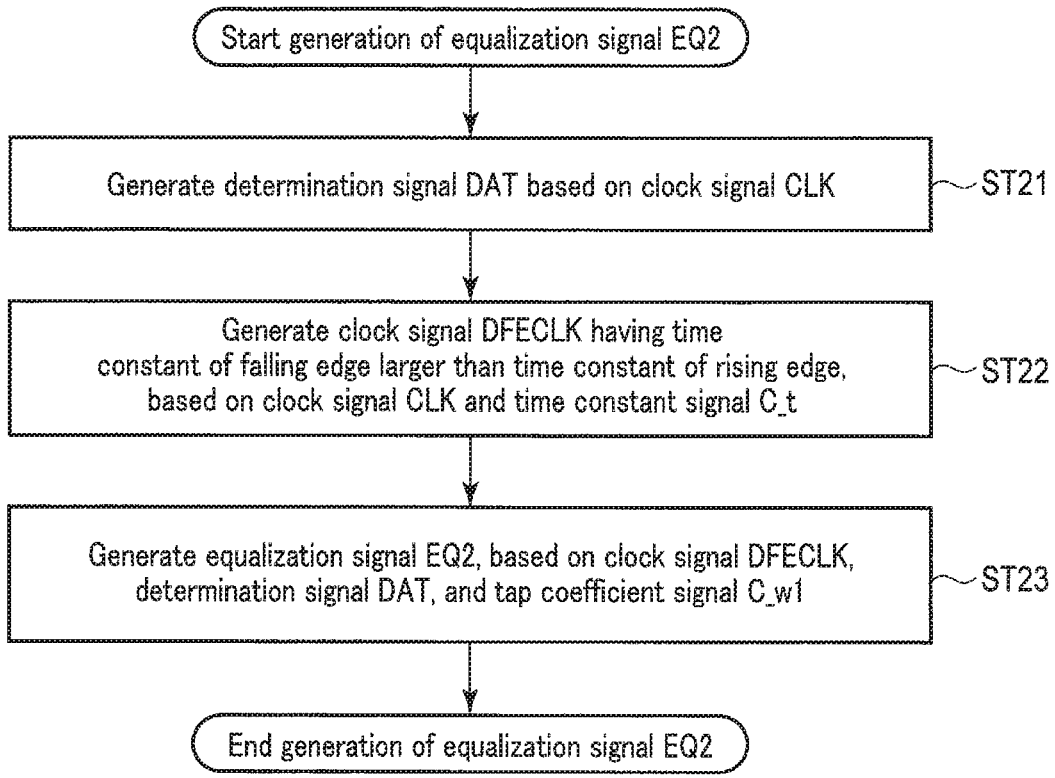
FIG. 18 is a flowchart for explaining an equalization signal generation operation of the equalizer circuit according to the second embodiment.

FIG. 18 is a flowchart for explaining an example of the operation of generating the equalization signal EQ2, which is part of the control operation of the equalizer circuit according to the second embodiment. FIG. 18 corresponds to ST20 described with reference to FIG. 17.

As shown in FIG. 18, in ST21, the determination circuit 122 generates the determination signals DAT90, /DAT90, DAT270 and /DAT270, based on the clock signals CLK90 and CLK 270. The generated determination signals DAT90, /DAT90, DAT270 and /DAT270 are supplied to the feedback circuit 132a.

In ST22, the DFE clock generation circuit 125a generates the clock signals DFECLK and /DFECLK, based on the clock signals CLK90 and CLK270 and the time constant signal C_t updated in ST50. The generated clock signals DFECLK and /DFECLK are supplied to the feedback circuit 132a. It should be noted that ST21 and ST22 may be executed in series in inverted order or in parallel.

In ST23, the feedback circuit 132a generates the equalization signal EQ2, based on the determination signals DAT90, /DAT90, DAT270 and /DAT270 generated in ST21, the clock signals DFECLK and /DFECLK generated in ST22, and the tap coefficient signal C_w1 supplied from the control circuit 15.

In this manner, the operation of generating the equalization signal EQ2 is completed.

2.2.2 Control Operation for Tap Coefficient Signal

Next, details of the control operation for the tap coefficient signal C_w1, which is part of the control operation of the equalizer circuit according to the second embodiment, will be described.

FIG. 19 is a table for explaining the update operation of the tap coefficient signal C_w1, which is part of the control operation of the equalizer circuit according to the second embodiment. FIG. 19 corresponds to ST30 to ST50 described with reference to FIG. 17.

As shown in FIG. 19, when the tap coefficient signal C_w1 is updated, sampling results Ds generated at sampling timings (hereinafter referred to as "sample times" as well) Ta and Tc and an error sampling result De generated at sample time Tc are used. More specifically, the control circuit 15 increases or decreases tap coefficient signal C_wk according to eight cases X1 to X8 shown in FIG. 19.

For example, in case X1, when the sampling results Ds are respectively determined to be "1" and "0" at sample times Tc and Ta and the error sampling result De is determined to be "0" at sample time Tc, the control circuit 15 determines that the tap coefficient signal C_w1 should be increased.

In case X3, when the sampling results Ds are determined to be "1" and "0" at sample times Tc and Ta and the error sampling result De is determined to be "1" at sample time Tc, the control circuit 15 determines that the tap coefficient signal C_w1 should be decreased.

Figure 21:
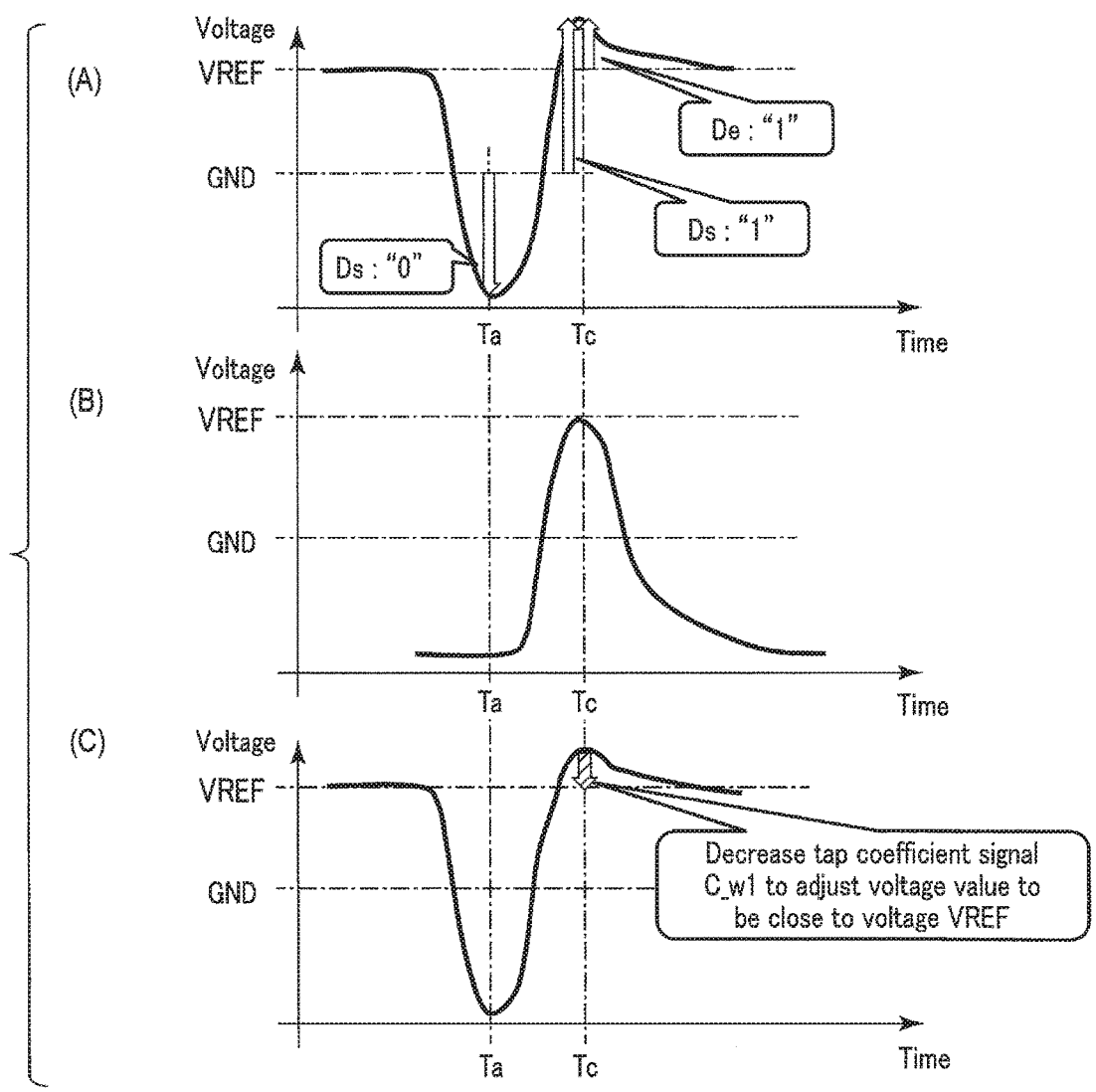
FIG. 21 shows diagrams for explaining another example of the tap coefficient signal update operation of the equalizer circuit according to the second embodiment.

Next, one specific example of the update operation mentioned above will be described with reference to FIG. 20 and FIG. 21. FIG. 20 and FIG. 21 correspond to the case X1 and the case X3, respectively, which are two of the cases described in FIG. 19. Specifically, in FIG. 20 and FIG. 21, an example of waveforms of the equalization signal EQ2 are shown, with a time plotted on the abscissa and a voltage plotted on the ordinate. More specifically, in a first column (A) of FIG. 20 and a first column (A) of FIG. 21, a synthetic waveform of the equalization signal EQ2 corresponding to data A1 and data A2 sampled at sample times Ta and Tc is shown. In a second column (B) of FIG. 20 and a second column (B) of FIG. 21, a waveform of the equalization signal EQ2 corresponding to data A2 is shown. In a third column (C) of FIG. 20 and a third column (C) of FIG. 21, a waveform of the equalization signal EQ2 corresponding to data A1 is shown.

First, the case X1 will be described with reference to FIG. 20.

As shown in the first column (A) of FIG. 20, the sampler circuit 13 compares the voltage values of the equalization signal EQ2 at sample times Ta and Tc with a voltage GND (e.g., 0V). In the example shown in the first column (A) of FIG. 20, the voltage value of the equalization signal EQ2 at sample time Ta is smaller than the voltage GND, so that the sampler circuit 13 determines that the sampling result Ds at sample time Ta is "0." The voltage value of the equalization signal EQ2 at sample time Tc is larger than the voltage GND, so that the sampler circuit 13 determines that the sampling result Ds at sample time Tc is "1."

The error sampler circuit 14 compares the voltage value of the equalization signal EQ2 at sample time Tc at which the sampling result Ds becomes "1" with the voltage VREF. In the example shown in the first column (A) of FIG. 20, the voltage value of the equalization signal EQ2 at sample time Tc is smaller than the voltage VREF, so that the sampler circuit 14 determines that the error sampling result Ds at sample time Ta is "0."

The waveform of the equalization signal EQ2 in the first column (A) of FIG. 20, which provides the above-described determination result, can be separated into a waveform corresponding to data A2 shown in the second column (B) of FIG. 20 and a waveform corresponding to data A1 shown in the third column (C) of FIG. 20. That is, in the case X1, the removal of a residual error at the rising portion of the waveform corresponding to data A1 is insufficient at sample time Tc in the third column (C) of FIG. 20, so that it is considered that the waveform corresponding to data A1 interferes with the waveform corresponding to data A2. Therefore, the control circuit 15 increases the tap coefficient signal C_w1 to increase the feedback amount throughout the feedback period, and adjusts the voltage value of the equalization signal EQ2 at sample time Tc to be close to the voltage VREF. As a result, it is possible to reduce the residual error at the rising portion of the waveform corresponding to data A1.

Next, the case X3 will be described with reference to FIG. 21.

As shown in the first column (A) of FIG. 21, the sampler circuit 13 compares the voltage values of the equalization signal EQ2 at sample times Ta and Tc with the voltage GND. In the example shown in the first column (A) of FIG. 21, the voltage value of the equalization signal EQ2 at sample time Ta is smaller than the voltage GND, so that the sampler circuit 13 determines that the sampling result Ds at sample time Ta is "0." The voltage value of the equalization signal EQ2 at sample time Tc is larger than the voltage GND, so that the sampler circuit 13 determines that the sampling result Ds at sample time Tc is "1."

The error sampler circuit 14 compares the voltage value of the equalization signal EQ2 at sample time Tc with the voltage VREF. In the example shown in the first column (A) of FIG. 21, the voltage value of the equalization signal EQ2 at sample time Tc is larger than the voltage VREF, so that the error sampler circuit 14 determines that the error sampling result De at sample time Tc is "1."

The waveform of the equalization signal EQ2, which provides the above-described determination result, can be separated into a waveform corresponding to data A2 shown in the second column (B) of FIG. 21 and a waveform corresponding to data A1 shown in the third column (C) of FIG. 21. That is, in the case X3, the removal of a residual error at the rising portion of the waveform corresponding to data A1 is excessive at sample time Tc, so that it is considered that the waveform corresponding to data A1 interferes with the waveform corresponding to data A2. Therefore, the control circuit 15 decreases the tap coefficient signal C_w1 to decrease the feedback amount throughout the feedback period, and adjusts the voltage value of the equalization signal EQ2 at sample time Tc to be close to the voltage VREF. As a result, it is possible to reduce the residual error at the rising portion of the waveform corresponding to data A1.

2.2.3 Control Operation of Time Constant Signal

Next, details of the control operation for the time constant signal C_t, which is part of the control operation of the equalizer circuit according to the second embodiment, will be described.

FIG. 22 is a table for explaining the update operation of the time constant signal C_t, which is part of the control operation of the equalizer circuit according to the second embodiment. FIG. 22 corresponds to ST30 to ST50 described with reference to FIG. 17.

As shown in FIG. 22, when the time constant signal C_t is updated, sampling results Ds generated at sample times Ta and Tc and an error sampling result Te generated at sample time Td are used. More specifically, the control circuit 15 increases or decreases time constant signal C_t according to eight cases Y1 to Y8 shown in FIG. 22.

For example, in case Y1, when the sampling results Ds are determined to be "1" and "0" at sample times Tc and Ta and the error sampling result De is determined to be "O" at sample time Td, the control circuit 15 determines that the time constant signal C_t should be decreased.

In case Y3, when the sampling results Ds are determined to be "1" and "0" at sample times Tc and Ta and the error sampling result De is determined to be "1" at sample time Td, the control circuit 15 determines that the tap coefficient signal C_t should be increased.

Figure 23:
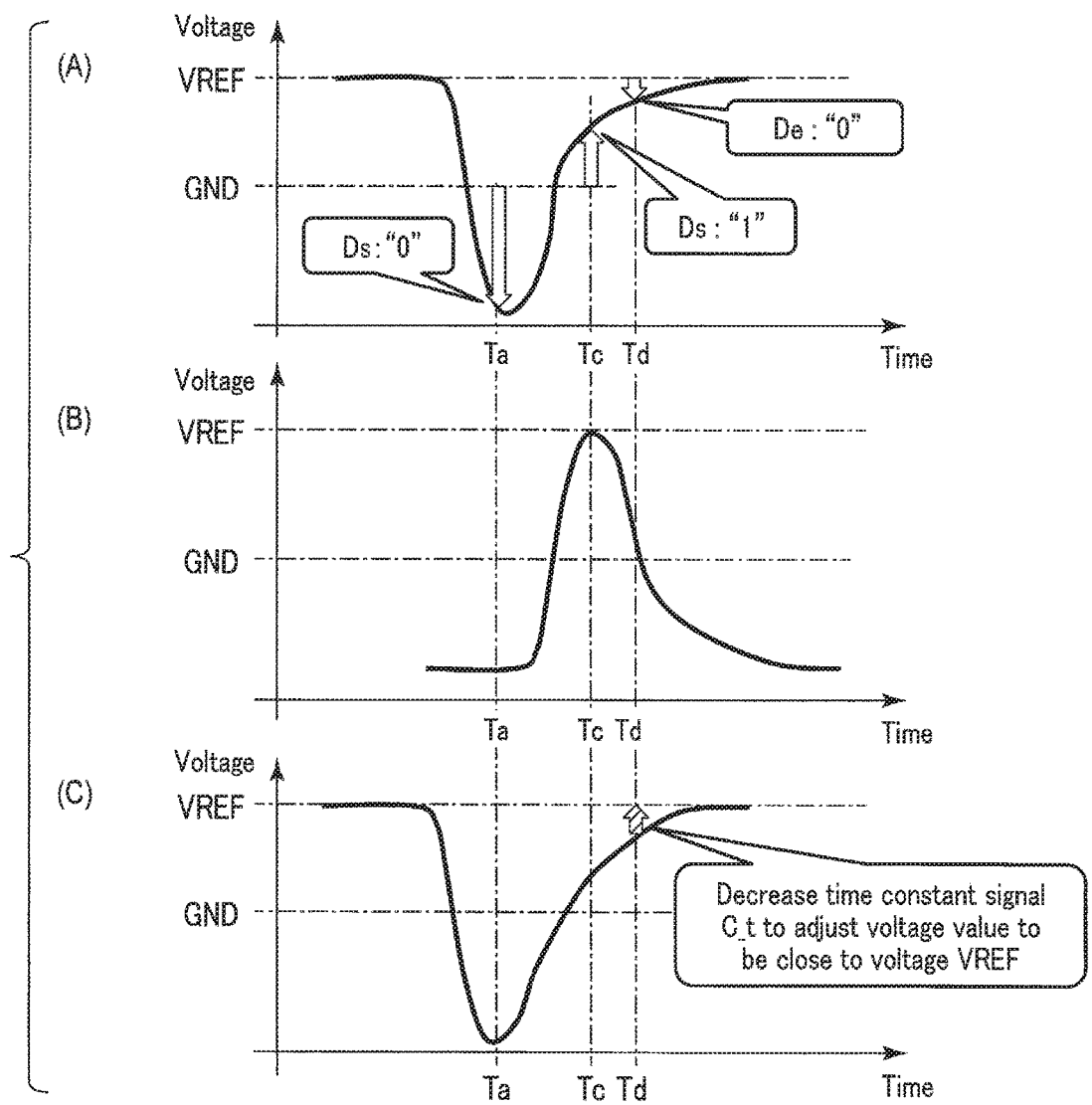
FIG. 23 shows diagrams for explaining an example of the time constant signal update operation of the equalizer circuit according to the second embodiment.

Next, one specific example of the update operation mentioned above will be described with reference to FIG. 23 and FIG. 24. FIG. 23 and FIG. 24 correspond to the case Y1 and the case Y3, respectively, which are two of the cases described in FIG. 22. Specifically, in FIG. 23 and FIG. 24, an example of waveforms of the equalization signal EQ2 is shown, with a time plotted on the abscissa and a voltage plotted on the ordinate. More specifically, in a first column (A) of FIG. 23 and a first column (A) of FIG. 24, a synthetic waveform of the equalization signal EQ2 corresponding to data A1 and data A2 sampled at sample times Ta and Tc is shown. In a second column (B) of FIG. 23 and a second column (B) of FIG. 24, a waveform of the equalization signal EQ2 corresponding to data A2 is shown. In a third column (C) of FIG. 23 and a third column (C) of FIG. 24, a waveform of the equalization signal EQ2 corresponding to data A1 is shown.

First, the case Y1 will be described with reference to FIG. 23.

As shown in the first column (A) of FIG. 23, the sampler circuit 13 compares the voltage values of the equalization signal EQ2 at sample times Ta and Tc with the voltage GND. In the example shown in the first column (A) of FIG. 23, the voltage value of the equalization signal EQ2 at sample time Ta is smaller than the voltage GND, so that the sampler circuit 13 determines that the sampling result Ds at sample time Ta is "0." The voltage value of the equalization signal EQ2 at sample time Tc is larger than the voltage GND, so that the sampler circuit 13 determines that the sampling result Ds at sample time Tc is "1."

The error sampler circuit 14 compares the voltage value of the equalization signal EQ2 at sample time Td with the voltage VREF. In the example shown in the first column (A) of FIG. 23, the voltage value of the equalization signal EQ2 at sample time Td is smaller than the voltage VREF, so that the error sampler circuit 14 determines that the error sampling result De at sample time Td is "0."

The waveform of the equalization signal EQ2 in the first column (A) of FIG. 23, which provides the above-described determination result, can be separated into a waveform corresponding to data A2 shown in the second column (B) of FIG. 23 and a waveform corresponding to data A1 shown in the third column (C) of FIG. 23. That is, in the case Y1, the removal of a residual error at the rising portion of the waveform corresponding to data A1 is insufficient at sample time Td in the third column (C) of FIG. 23, so that it is considered that the waveform corresponding to data A1 interferes with the waveform corresponding to data A2. Therefore, the control circuit 15 decreases the time constant signal C_t to increase the feedback amount in the latter half of the feedback period, and adjusts the voltage value of the equalization signal EQ2 at sample time Td to be close to the voltage VREF. As a result, it is possible to reduce the residual error at the rising portion of the waveform corresponding to data A1.

Next, the case Y3 will be described with reference to FIG. 24.

As shown in the first column (A) of FIG. 24, the sampler circuit 13 compares the voltage values of the equalization signal EQ2 at sample times Ta and Tc with the voltage GND. In the example shown in the first column (A) of FIG. 24, the voltage value of the equalization signal EQ2 at sample time Ta is smaller than voltage GND, so that the sampler circuit 13 determines that the sampling result Ds at sample time Ta is "0." The voltage value of the equalization signal EQ2 at sample time Tc is larger than voltage GND, so that the sampler circuit 13 determines that the sampling result Ds at sample time Tc is "0."

The error sampler circuit 14 compares the voltage value of the equalization signal EQ2 at sample time Td with the voltage VREF. In the example shown in the first column (A) of FIG. 24, the voltage value of the equalization signal EQ2 at sample time Td is larger than the voltage VREF, so that the error sampler circuit 14 determines that the error sampling result De at sample time Tc is "1."

The waveform of the equalization signal EQ2, which provides the above-described determination result, can be separated into a waveform corresponding to data A2 shown in the second column (B) of FIG. 24 and a waveform corresponding to data A1 shown in the third column (C) of FIG. 24. That is, in the case Y3, the removal of a residual error at the rising portion of the waveform corresponding to data A1 is excessive at sample time Td, so that it is considered that the waveform corresponding to data A1 interferes with the waveform corresponding to data A2. Therefore, the control circuit 15 increases time constant signal C_t to decrease the feedback amount in the latter half of the feedback period, and adjusts the voltage value of the equalization signal EQ2 at sample time Td to be close to the voltage VREF. As a result, it is possible to reduce the residual error at the rising portion of the waveform corresponding to data A1.

2.3 Advantageous Effects of Present Embodiment

According to the second embodiment, an increase or decrease in the time constant signal C_t corresponds to, for example, an increase or a decrease in the amounts of current flowing through the variable current sources I4A and I5A of the DFE clock generation circuit 125a. That is, the control circuit 15 can adjust the time constants of the falling edge of the clock signals DFECLK and /DFECLK, based on the time constant signal C_t.

Further, the sampler circuit 13 generates a sampling result Ds at sample time Ta corresponding to data A1 and a sampling result Ds at sample time Tc corresponding to data A2. The error sampler circuit 14 generates an error sampling result De at sample time Td corresponding to an edge portion of data A2. As a result, the control circuit 15 can determine whether the time constant signal C_t should be increased or decreased, based on the sampling result Ds at sample time Ta, the sampling result Ds at sample time Tc, and the error sampling result De at sample time Td. Since sample time Td is in the latter half of the feedback period, the control circuit 15 can determine whether the removal of a residual error in the latter half of the feedback period is insufficient or excessive by evaluating the error sampling result De. The control circuit 15 can decrease the time constant signal C_t if the evaluation shows that the removal of the residual error is insufficient, and can increase the time constant signal C_t if the evaluation shows that the removal of the residual error is excessive. Therefore, the impulse response characteristics of the equalizer circuit 10 can be improved more adaptively.

According to the second embodiment, an increase or decrease in the tap coefficient signal C_wk corresponds to, for example, an increase or decrease in the amounts of current flowing through the variable current sources I2A and I3A of the DFE clock generation circuit 125a. That is, the control circuit 15 can adjust the tap coefficient Wk, based on tap coefficient signal C_wk.

Further, the sampler circuit 13 generates a sampling result Ds at sample time Ta corresponding to data A1 and a sampling result Ds at sample time Tc corresponding to data A2. The error sampler circuit 14 generates an error sampling result De at sample time Tc. As a result, the control circuit 15 can determine whether the tap coefficient signal C_wk should be increased or decreased, based on the sampling result Ds at sample time Ta, the sampling result Ds at sample time Tc, and the error sampling result De at sample time Tc. Therefore, the control circuit 15 can determine whether the removal of a residual error throughout the feedback period is insufficient or excessive by evaluating the error sampling result De. The control circuit 15 can increase the tap coefficient signal C_wk if the evaluation shows that the removal of the residual error is insufficient, and can decrease the tap coefficient signal C_wk if the evaluation shows that the removal of the residual error is excessive. Therefore, the impulse response characteristics of the equalizer circuit 10 can be improved more adaptively.

3. Modifications

The embodiments are not limited to the first and second embodiments described above, and various modifications are can be made. For example, the above-mentioned DFE clock generation circuits 125 and 125a of the first and second embodiments are nothing but examples, and the following circuit configurations are also applicable. In the description below, a modified example of the DFE clock generation circuit 125a explained in the second embodiment will be described for convenience, but a similar modification is applicable to the DFE clock generation circuit 125 explained in the first embodiment.

3.1 First Modification

FIG. 25 shows circuit diagrams for explaining a circuit configuration of a DFE clock generation circuit of the equalizer circuit according to a first modification. Specifically, examples of circuit diagrams for generating clock signals DFECLK and /DFECLK are shown in an upper portion P1b of FIG. 25 and a lower portion P2b of FIG. 25. The upper portion P1b and lower portion P2b of FIG. 25 respectively correspond to the upper portion P1a and lower portion P2a of FIG. 16 explained in the second embodiment.

As shown in FIG. 25, a DFE clock generation circuit 125b according to the first modification includes variable resistors R6 and R7, instead of the variable current sources I4A and I5A included in the DFE clock generation circuit 125a according to the second embodiment. That is, as shown in the upper portion P1b of FIG. 25, the variable resistor R6 includes a first terminal connected to the second terminal of transistor Tr20 and a second terminal to which the voltage VSS is supplied. As shown in the lower portion P2b of FIG. 25, the variable resistor R7 includes a first terminal connected to the second terminal of transistor Tr22 and a second terminal to which the voltage VSS is supplied.

Upon receipt of the time constant signal C_t supplied from the control circuit 15, the variable resistors R6 and R7 can adjust their resistance values in accordance with time constant signal C_t. As a result, the DFE clock generation circuit 125b can adjust the amount by which the potential of the node N12 should be pulled down when a path between the node N12 and the variable resistor R6 is formed. Further, the DFE clock generation circuit 125b can adjust the amount by which the potential of the node N13 should be pulled down when a path between the node N13 and the variable resistor R7 is formed. That is, the variable resistors R6 and R7 can respectively adjust the time constant of the falling edge of the clock signals DFECLK and /DFECLK in accordance with the time constant signal C_t. Therefore, the variable resistors R6 and R7 can provide the equivalent advantages as the variable current sources I4A and I5A.

3.2 Second Modification

FIG. 26 shows circuit diagrams for explaining a circuit configuration of a DFE clock generation circuit of the equalizer circuit according to a second modification. Specifically, examples of circuit diagrams for generating the clock signals DFECLK and /DFECLK are shown in an upper portion P1c of FIG. 26 and a lower portion P2c of FIG. 26. The upper portion P1c and lower portion P2c of FIG. 26 respectively correspond to the upper portion P1a and lower portion P2a of FIG. 16 explained in the second embodiment.

As shown in the upper portion P1c of FIG. 26, a DFE clock generation circuit 125c according to the second modification includes transistors Tr23, Tr24, Tr25 and Tr26 and a variable current source I4A. The transistors Tr23 and Tr24 are, for example, P-type transistors, and the transistors Tr25 and Tr26 are, for example, N-type transistors.

The transistor Tr23 includes a first terminal to which the voltage VDD is supplied, a second terminal connected to a first terminal of transistor Tr24, and a gate to which the clock signal CLK270 is supplied. The transistor Tr24 includes a second terminal connected to the node N12 and a gate to which the clock signal CLK270_D is supplied.

The transistor Tr25 includes a first terminal connected to the node N12 and a gate to which the clock signal CLK270 is supplied. The transistor Tr26 includes a first terminal connected to the node N12 and a gate to which the clock signal CLK270_D is supplied. The variable current source I4A includes an input terminal at which a second terminal of the transistor Tr25 and a second terminal of the transistor Tr26 are connected, and an output terminal to which the voltage VSS is supplied.

With the above NOR circuit configuration, the DFE clock generation circuit 125c can output the clock signal DFECLK from the node N12, based on the clock signal CLK270.

Upon receipt of the time constant signal C_t supplied from the control circuit 15, the variable current source I4A can adjust the magnitude of the current flowing through the variable current source I4A in accordance with the time constant signal C_t. As a result, the DFE clock generation circuit 125c can adjust the amount by which the potential of the node N12 should be pulled down when a path between the node N12 and the variable current source I4A is formed. That is, the variable current source I4A can adjust the time constant of the falling edge of the clock signal DFECLK in accordance with the time constant signal C_t.

The configuration shown in the lower portion P2c of FIG. 26 is substantially similar to that shown in the upper portion P1c of FIG. 26. That is, as shown in the lower portion P2c of FIG. 26, the DFE clock generation circuit 125c according to the second modification includes transistors Tr27, Tr28, Tr29 and Tr30 and a variable current source I5A. The transistors Tr27 and Tr28 are, for example, P-type transistors, and the transistors Tr29 and Tr30 are, for example, N-type transistors.

The transistor Tr27 includes a first terminal to which the voltage VDD is supplied, a second terminal connected to a first terminal of transistor Tr28, and a gate to which the clock signal CLK90 is supplied. The transistor Tr28 includes a second terminal connected to the node N13 and a gate to which the clock signal CLK90_D is supplied.

The transistor Tr29 includes a first terminal connected to the node N13 and a gate to which the clock signal CLK90 is supplied. The transistor Tr30 includes a first terminal connected to the node N13 and a gate to which the clock signal CLK90_D is supplied. The variable current source I5A includes an input terminal at which a second terminal of the transistor Tr29 and a second terminal of the transistor Tr30 are connected, and an output terminal to which the voltage VSS is supplied.

With the above NOR circuit configuration, the DFE clock generation circuit 125c can output the clock signal /DFECLK from the node N13, based on the clock signal CLK90.

Upon receipt of the time constant signal C_t supplied from the control circuit 15, the variable current source I5A can adjust the magnitude of the current flowing through the variable current source I5A in accordance with the time constant signal C_t. As a result, the DFE clock generation circuit 125c can adjust the amount by which the potential of the node N13 should be pulled down when a path between the node N13 and the variable current source I5A is formed. That is, the variable current sources I5A can adjust the time constant of the falling edge of the clock signal /DFECLK in accordance with the time constant signal C_t.

3.3 Third Modification

A DFE clock generation circuit 125d according to a third modification has a similar configuration to that of the DFE clock generation circuit 125a according to the second embodiment, but signals input to the logic circuits OR1 and OR2 are different.

FIG. 27 shows circuit diagrams for explaining a circuit configuration of the DFE clock generation circuit of the equalizer circuit according to the third modification. Specifically, examples of circuit diagrams for generating the clock signals DFECLK and /DFECLK are shown in an upper portion P1d of FIG. 27 and a lower portion P2d of FIG. 27. The upper portion P1d and lower portion P2d of FIG. 27 respectively correspond to the upper portion P1a and lower portion P2a of FIG. 16 explained in the second embodiment.

More specifically, as shown in the upper portion P1d of FIG. 27, the clock signals CLK270 and CLK0 are input to the logic circuit OR1. Since the clock signal CLK0 is a signal whose phase is delayed by 90° from the phase of clock signal CLK270, it can provide equivalent advantages to those of the clock signal CLK270_D.

Likewise, as shown in the lower portion P2d of FIG. 27, the clock signals CLK90 and CLK180 are input to the logic circuit OR2. Since the clock signal CLK180 is a signal whose phase is delayed by 90° from the phase of the clock signal CLK90, it can provide equivalent advantages to those of the clock signal CLK90_D.

With the above configuration, it is possible to generate the clock signals DFECLK and /DFECLK only with an existing clock signal, with no need for internally generating such new clock signals as clock signals CLK270_D and CLK90_D.

4. Others

While certain embodiments have been described, these embodiments have been presented by way of example only, and are not intended to limit the scope of the embodiments. Indeed, the novel embodiments described herein may be embodied in a variety of other forms; furthermore, various omissions, substitutions and changes in the form of the embodiments described herein may be made without departing from the spirit. The embodiments and modifications are included in the scope and gist of the invention, and also included in the invention recited in the claims and the scope of equivalents of the invention.

What is claimed is:

1. An equalizer circuit comprising a nonlinear equalizer, the nonlinear equalizer including:
   a determination circuit configured to generate a second signal indicating a digital value of a first signal, based on a first clock signal;
   a clock generation circuit configured to generate a second clock signal having a time constant of a falling edge larger than a time constant of a rising edge, based on the first clock signal; and
   a feedback circuit configured to generate a third signal by feeding back the second signal to the first signal, based on the second clock signal.

2. The circuit of claim 1, wherein a period of time from start of a rise of the second clock signal to start of a fall of the second clock signal is shorter than a period of time from start of a rise of the first clock signal to start of a fall of the first clock signal.

3. The circuit of claim 2, further comprising:
   a control circuit configured to set the time constant of the falling edge of the second clock signal.

4. The circuit of claim 3, further comprising:
   a sampler circuit configured to generate first sampling results of the third signal based on a first voltage and second sampling results of the third signal based on a second voltage different from the first voltage,
   wherein the control circuit is configured to set the time constant of the falling edge of the second clock signal, based on the first sampling results and the second sampling results.

5. The circuit of claim 4, wherein the control circuit is configured to set the time constant of the falling edge of the second clock signal, based on one of the first sampling results at a first sample time, another one of the first sampling results at a second sample time, and one of the second sampling results at a third sample time,
   the first sample time corresponds to first data included in the third signal,
   the second sample time corresponds to second data that is consecutive to the first data in the third signal, and
   the third sample time is a time that is a particular period of time passes from the second sample time.

6. The circuit of claim 4, wherein the feedback circuit is configured to feed back a signal obtained by multiplying the second signal by a coefficient to the first signal, and
   the control circuit is configured to set the coefficient, based on the first sampling results and the second sampling results.

7. The circuit of claim 6, wherein the control circuit is configured to set the coefficient, based on one of the first sampling results at a first sample time, another one of the first sampling results at a second sample time, and one of the second sampling results at the second sample time,
   the first sample time corresponds to first data included in the third signal, and
   the second sample time corresponds to second data that is consecutive to the first data in the third signal.

8. The circuit of claim 1, wherein the feedback circuit includes:
   a first transistor including a first terminal to which the third signal is supplied and a gate to which the second clock signal is supplied;
   a second transistor including a first terminal electrically connected to a second terminal of the first transistor and a gate to which the second signal is supplied; and
   a first current source which provides a current flowing through the first transistor and the second transistor.

9. The circuit of claim 8, wherein the clock generation circuit includes:

a logic circuit including a first input terminal to which the first clock signal is supplied, a second input terminal to which a third clock signal having a particular phase delay from the first clock signal is supplied, and an output terminal from which a logical product result of the first clock signal and the third clock signal is output;

a third transistor including a first terminal to which a third voltage is supplied, a second terminal electrically connected to a first node from which the second clock signal is output, and a gate to which the logical product result is supplied;

a fourth transistor including a first terminal electrically connected to the first node and a gate to which the logical product result is supplied; and a second current source which provides a current flowing through the fourth transistor.

10. The circuit of claim 9, wherein the first current source includes a first variable current source, and the second current source includes a second variable current source, the equalizer circuit further comprising:

a control circuit configured to set a magnitude of a current flowing through the first variable current source and the second variable current source.

11. The circuit of claim 8, wherein the clock generation circuit includes:

a third transistor including a first terminal to which a third voltage is supplied and a gate to which the first clock signal is supplied;

a fourth transistor including a first terminal electrically connected to a second terminal of the third transistor, a second terminal electrically connected to a first node from which the second clock signal is output, and a gate to which a third clock signal having a particular phase delay from the first clock signal is supplied;

a fifth transistor including a first terminal electrically connected to the first node and a gate to which the first clock signal is supplied;

a sixth transistor including a first terminal electrically connected to the first node and a gate to which the third clock signal is supplied; and a second current source which provides a current flowing through the fifth transistor and the sixth transistor.

12. The circuit of claim 11, wherein the first current source includes a first variable current source, and the second current source includes a second variable current source, the equalizer circuit further comprising:

a control circuit configured to set a magnitude of a current flowing through the first variable current source and the second variable current source.

13. A control method for an equalizer circuit, comprising:

generating a second signal indicating a digital value of a first signal, based on a first clock signal;

generating a second clock signal having a time constant of a falling edge larger than a time constant of a rising edge, based on the first clock signal; and generating a third signal by feeding back the second signal to the first signal, based on the second clock signal.

14. The method of claim 13, wherein a period of time from start of a rise of the second clock signal to start of a fall of the second clock signal is shorter than a period of time from start of a rise of the first clock signal to start of a fall of the first clock signal.

15. The method of claim 14, further comprising:

setting the time constant of the falling edge of the second clock signal.

16. The method of claim 15, further comprising:

generating first sampling results of the third signal based on a first voltage;

generating second sampling results of the third signal based on a second voltage different from the first voltage, wherein the setting includes setting the time constant of the falling edge of the second clock signal, based on the first sampling results and the second sampling results.

17. The method of claim 16, wherein setting the time constant includes setting the time constant of the falling edge of the second clock signal, based on one of the first sampling results at a first sample time, another one of the first sampling results at a second sample time, and one of the second sampling results at a third sample time, the first sample time corresponds to first data included in the third signal, the second sample time corresponds to second data that is consecutive to the first data in the third signal, and the third sample time is a time that is a particular period of time passes from the second sample time.

18. The method of claim 16, wherein generating the third signal includes feeding back a signal obtained by multiplying the second signal by a coefficient to the first signal, the method further comprising:

setting the coefficient based on the first sampling results and the second sampling results.

19. The method of claim 18, wherein setting the coefficient includes setting the coefficient based on one of the first sampling results at a first sample time, another one of the first sampling results at a second sample time, and one of the second sampling results at the second sample time, the first sample time corresponds to first data included in the third signal, the second sample time corresponds to second data that is consecutive to the first data in the third signal.

* * * * *